__(12) United States Patent__  
Shimizu et al.

(10) Patent No.: US 7,608,936 B2  
(45) Date of Patent: Oct. 27, 2009

(54) FAUCET GENERATOR

(75) Inventors: Takeshi Shimizu, Fukuoka (JP);  
Makoto Hatakeyama, Fukuoka (JP);  
Masahiro Kuroishi, Fukuoka (JP);  
Naoyuki Onodera, Fukuoka (JP);  
Tomoko Sato, Fukuoka (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 12/177,045

(22) Filed: Jul. 21, 2008

(65) Prior Publication Data

US 2009/0026769 A1 Jan. 29, 2009

Related U.S. Application Data

(60) Provisional application No. 60/984,731, filed on Nov. 2, 2007.

(30) Foreign Application Priority Data

Jul. 23, 2007 (JP) ............................. 2007-191352

(51) Int. Cl.  
*F03B 13/00* (2006.01)  
*H02P 9/04* (2006.01)

(52) U.S. Cl. ........................................ 290/43; 290/54

(58) Field of Classification Search .................. 290/43, 290/54, 1 R; 310/268, 168, 216; 60/398, 60/608, 325, 671; 166/65.1, 66.5; 175/107; 416/85; 415/185  
See application file for complete search history.

(56) References Cited

U.S. PATENT DOCUMENTS 2,097,166 A * 10/1937 Stone ........................ 392/481  
4,731,545 A * 3/1988 Lerner et al. ................ 290/54  
5,140,254 A * 8/1992 Katzman .................... 322/35

6,011,334 A * 1/2000 Roland ....................... 310/86

(Continued)

FOREIGN PATENT DOCUMENTS

JP 2004263466 A * 9/2004

(Continued)

*Primary Examiner*—Julio Gonzalez  
(74) *Attorney, Agent, or Firm*—Kimble Intellectual Property Law, PLLC

(57) ABSTRACT

A faucet generator includes; a rotor vane which is disposed in a water supply channel; an annular magnet which is rotatable integrally with the rotor vane; and a stator having: a coil which is disposed to be opposed to an end face of the magnet that is substantially perpendicular to a radial direction; a plurality of inductors which are placed separately from one another along a circumferential direction between the end face of the magnet and the coil; and a yoke which is disposed to be continuously contacted with the inductor and surround the coil. The axial direction of the rotor vane is substantially parallel to the water supply channel. In the annular magnet, the end faces which are substantially perpendicular to a radial direction are alternately magnetized with N and S poles along the circumferential direction of the magnet. In the yoke, cut-away portions which are formed by cutting away portions that are opposed to the circumferential face portion of the coil, and that are in the vicinity of the tip ends of the inductors, in one end that is on the side where said inductors are disposed, whereby portions of the yoke which are in the vicinity of the tip ends of the inductors are formed so as to relatively recede from the magnetic inducible area of the magnet.

9 Claims, 24 Drawing Sheets

U.S. PATENT DOCUMENTS

| | | | |
|---|---|---|---|
| 6,036,333 A * | 3/2000 | Spiller | 362/192 |
| 7,253,536 B2 * | 8/2007 | Fujimoto et al. | 290/43 |
| 2008/0217923 A1 * | 9/2008 | Yen | 290/54 |
| 2008/0231056 A1 * | 9/2008 | Wen | 290/54 |
| 2008/0284174 A1 * | 11/2008 | Nagler | 290/54 |
| 2009/0026768 A1 * | 1/2009 | Shimizu et al. | 290/54 |

FOREIGN PATENT DOCUMENTS

| | | | |
|---|---|---|---|
| JP | 2004-336982 A | | 11/2004 |
| JP | 2009027893 A | * | 2/2009 |
| JP | 2009027894 A | * | 2/2009 |
| JP | 2009044827 A | * | 2/2009 |

* cited by examiner

FAUCET GENERATOR

This application claims the benefit of U.S. Provisional Application No. 60/984,731, filed Nov. 2, 2007. This application also claims priority from Japanese Patent Application No. 2007-191352, filed on Jul. 23, 2007 in the Japanese Patent Office. This disclosure of each of these applications is incorporated herein in their entirety by reference.

TECHNICAL FIELD

The present invention relates to a faucet generator which generates electricity by using a flow of water supply.

RELATED ART

Conventionally, an automatic faucet apparatus has been known in which a hand introduced under a tap is sensed by a sensor, and water is automatically discharged from the tap. Also an apparatus has been known in which a small generator is disposed in a channel of such an automatic faucet apparatus, an electric power obtained by the generator is stored, and the stored power is supplied additionally to a circuit such as the sensor (for example, see Patent Reference 1).

As such a generator, there are a generator having "radial arrangement" in which a coil is disposed radially outside a permanent magnet (for example, see FIG. 4 of Patent Reference 1), and a generator having "axial arrangement" in which a coil is disposed so as to be opposed to an end face of a permanent magnet that is substantially perpendicular to a radial direction (for example, see FIG. 5 of Patent Reference 1). In an application where a generator having a small radial dimension is required, the use of a generator or "axial arrangement" is more preferable than that of a generator of "radial arrangement".

Among permanent magnets used in generators of "axial arrangement", there are those in which end faces that are substantially perpendicular to a radial direction are alternately magnetized with N and S poles. In this configuration, when a short-circuit of a magnetic path occurs with respect to a yoke portion in the vicinity of an inductor which is immediately below adjacent poles, there arises a problem in that the formation of interlinking magnetic paths circling a coil is impeded to reduce the coil efficiency, the generated electricity amount, and the like.

In an automatic faucet apparatus, recently, the water-saving effect is emphasized. In such an automatic faucet apparatus, the water flow amount (hydro energy) which can be used in electricity generation is small, and it is strongly requested to reduce even a small energy loss in conversion from hydro energy to an electric power.

[Patent Reference 1] Japanese Patent Unexamined Application Publication No. 2004-336982

SUMMARY

The invention provides a faucet generator in which the power generation efficiency can be improved.

According to a first aspect of the invention, a faucet generator is provided which is characterized in that the faucet generator includes:

a rotor vane which is disposed in a water supply channel;
an annular magnet which is rotatable integrally with the rotor vane; and
a stator having: a coil which is disposed to be opposed to an end face of the magnet that is substantially perpendicular to a radial direction; a plurality of inductors which are placed separately from one another along a circumferential direction between the end face of the magnet and the coil; and a yoke which is disposed to be continuously contacted with the inductors and surround the coil, an axial direction of the rotor vane is substantially parallel to the water supply channel, end faces of the annular magnet which are substantially perpendicular to a radial direction are alternately magnetized with N and S poles along a circumferential direction of the magnet, and, in one end of the yoke that is on a side where the inductors are disposed, portions which are in the vicinity of tip ends of the inductors are formed to relatively recede from a magnetic inducible area of the magnet.

According to the invention, a faucet generator in which the power generation efficiency can be improved is provided.

DESCRIPTION OF REFERENCE NUMERALS AND SIGNS

Figure 1:
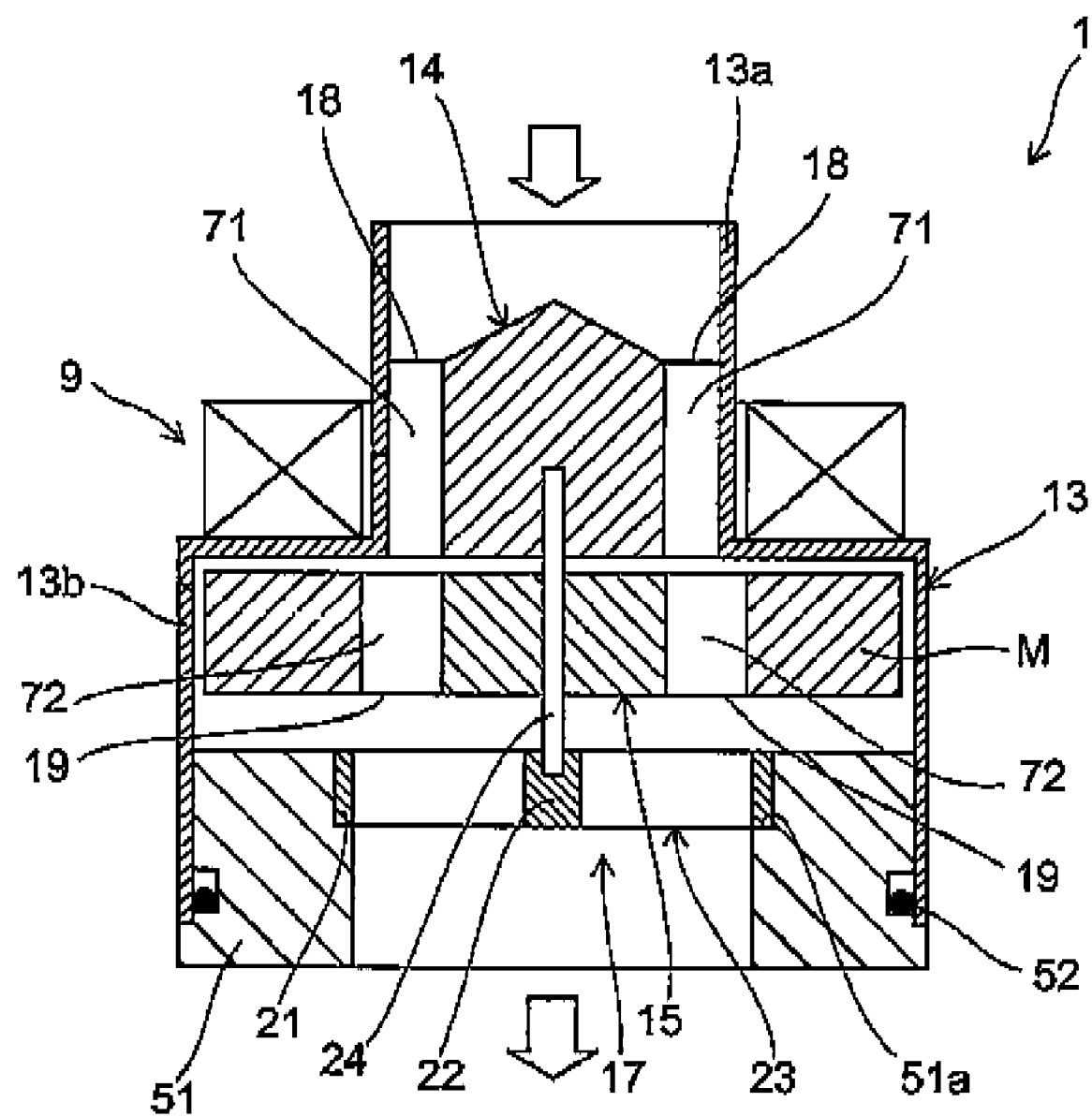
FIG. 1 is a schematic sectional view illustrating a generator of an embodiment of the invention.

1 generator, 9 stator, 13 cylindrical body, 14 pre-rotation stator vane, 15 rotor vane, 15*a* rotor vane ring, 30 coil, 31*a* inductor, 31*b* yoke, 32 first yoke, 33 second yoke, 33*a* inductor, 34 third yoke, 39 cutaway portion, 39*a* cutaway portion, 40 cutaway portion, 40*a* cutaway portion, 41 magnetic inducible area, 43 substantial magnetic inducible area, 51 sealing member, 232 yoke, 232*a* yoke, 232*b* yoke, 233 yoke, 233*a* yoke, 233*b* yoke, 239 cutaway portion, 240 cutaway portion, M magnet, 314 cap, 314*b* space portion, 315*a* rotor vane integral rotary member, 318 nozzle

DETAILED DESCRIPTION

Hereinafter, embodiments of the invention will be described with reference to the drawings.

In the drawings, identical components are denoted by the same reference numerals.

FIG. 1 is a schematic sectional view illustrating a generator 1 of an embodiment of the invention.

Figure 4:
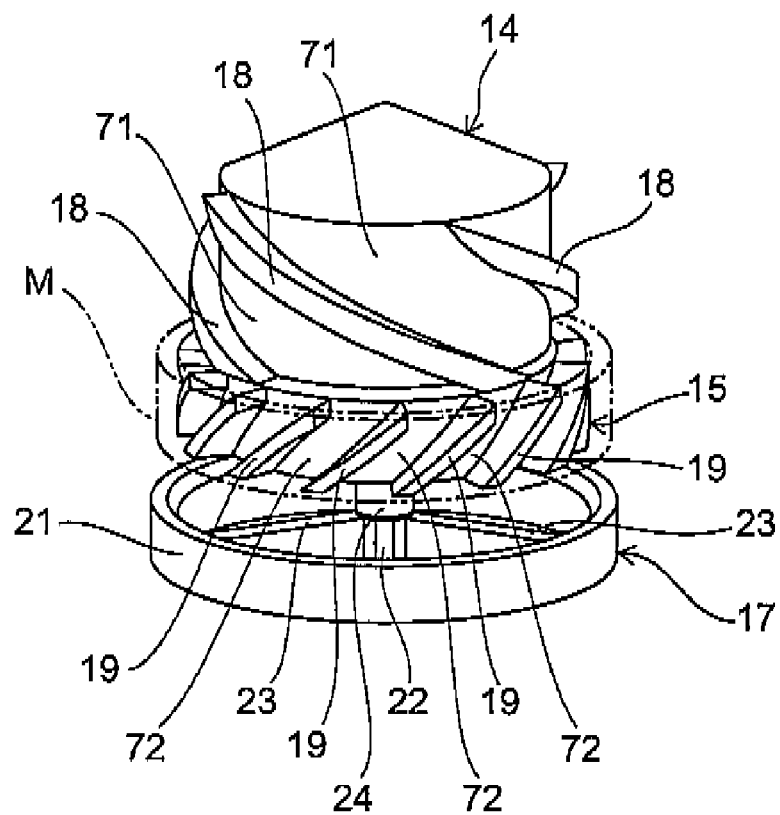
FIG. 4 is a schematic perspective view illustrating a pre-rotation stator vane, a rotor vane, and a bearing in the generator.
Figure 4:
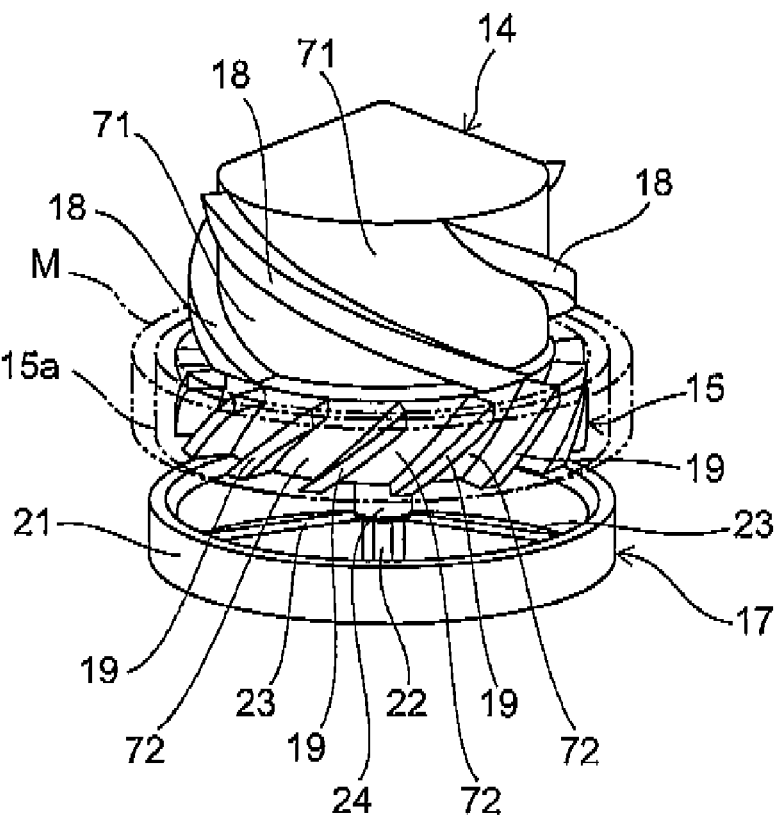

FIG. 4 is a schematic perspective view illustrating a pre-rotation stator vane 14, a rotor vane 15, and a bearing 17 in the generator 1. FIG. 4(*a*) exemplarily shows the case where a rotor vane ring 15*a* is not provided, and FIG. 4(*b*) exemplarily shows the case where the rotor vane ring 15*a* is provided.

As shown in FIG. 1, the generator 1 mainly includes a cylindrical body 13, the pre-rotation stator vane 14, the rotor vane 15, a magnet M, a stator 9, and a sealing member 51. These components are housed in a case 12 (see FIG. 3). The arrows which are drawn above the pre-rotation stator vane 14 and below the sealing member 51 indicate the direction of flowing water.

Prior to description of the generator 1, a generator-equipped automatic faucet apparatus including the generator 1 will be described.

Figure 2:
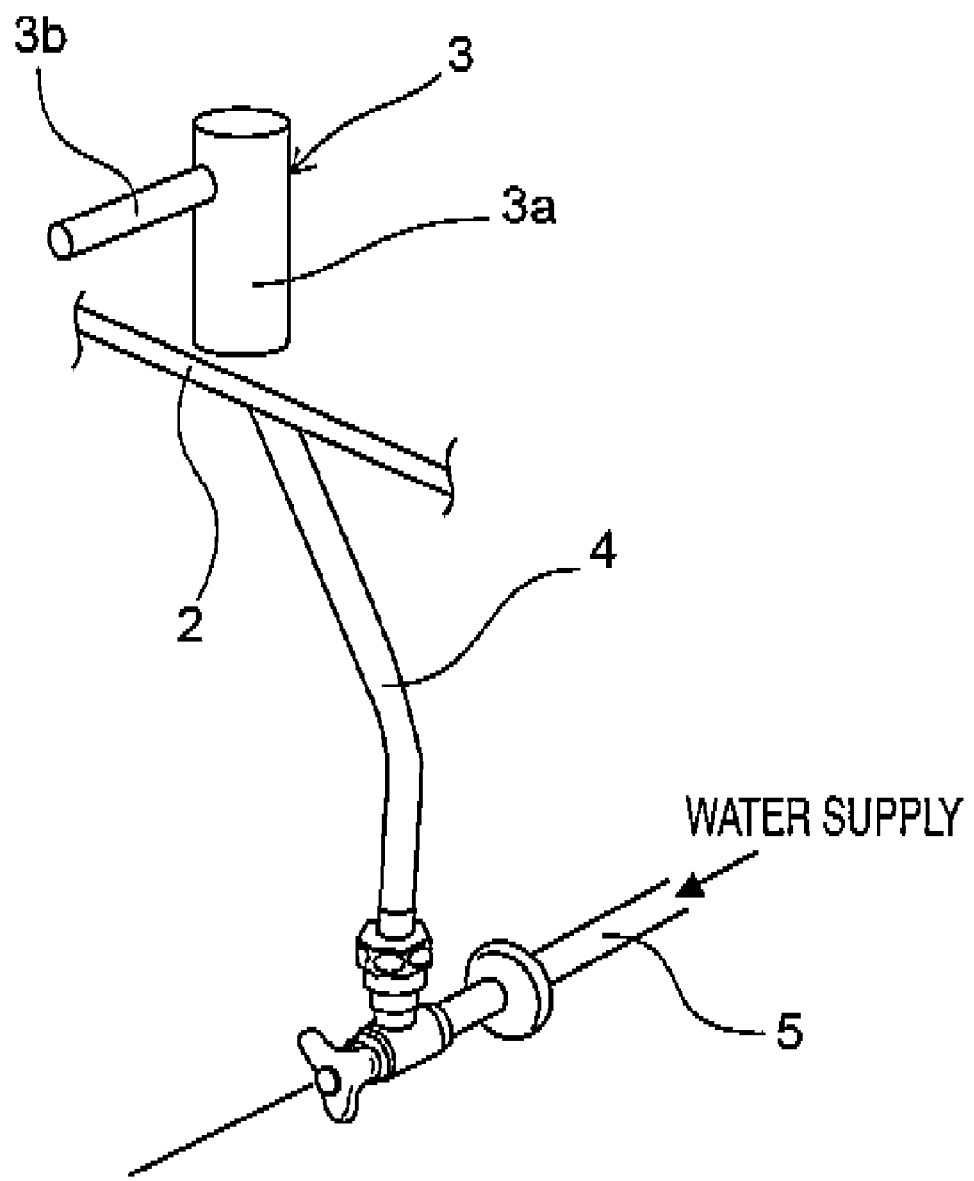
FIG. 2 is a schematic view illustrating an example of mounting of an automatic faucet apparatus including the generator of the embodiment of the invention.

FIG. 2 is a schematic view illustrating an example of mounting of an automatic faucet apparatus including the generator of the embodiment of the invention (hereinafter, often referred to as simply an automatic faucet apparatus).

Figure 3:
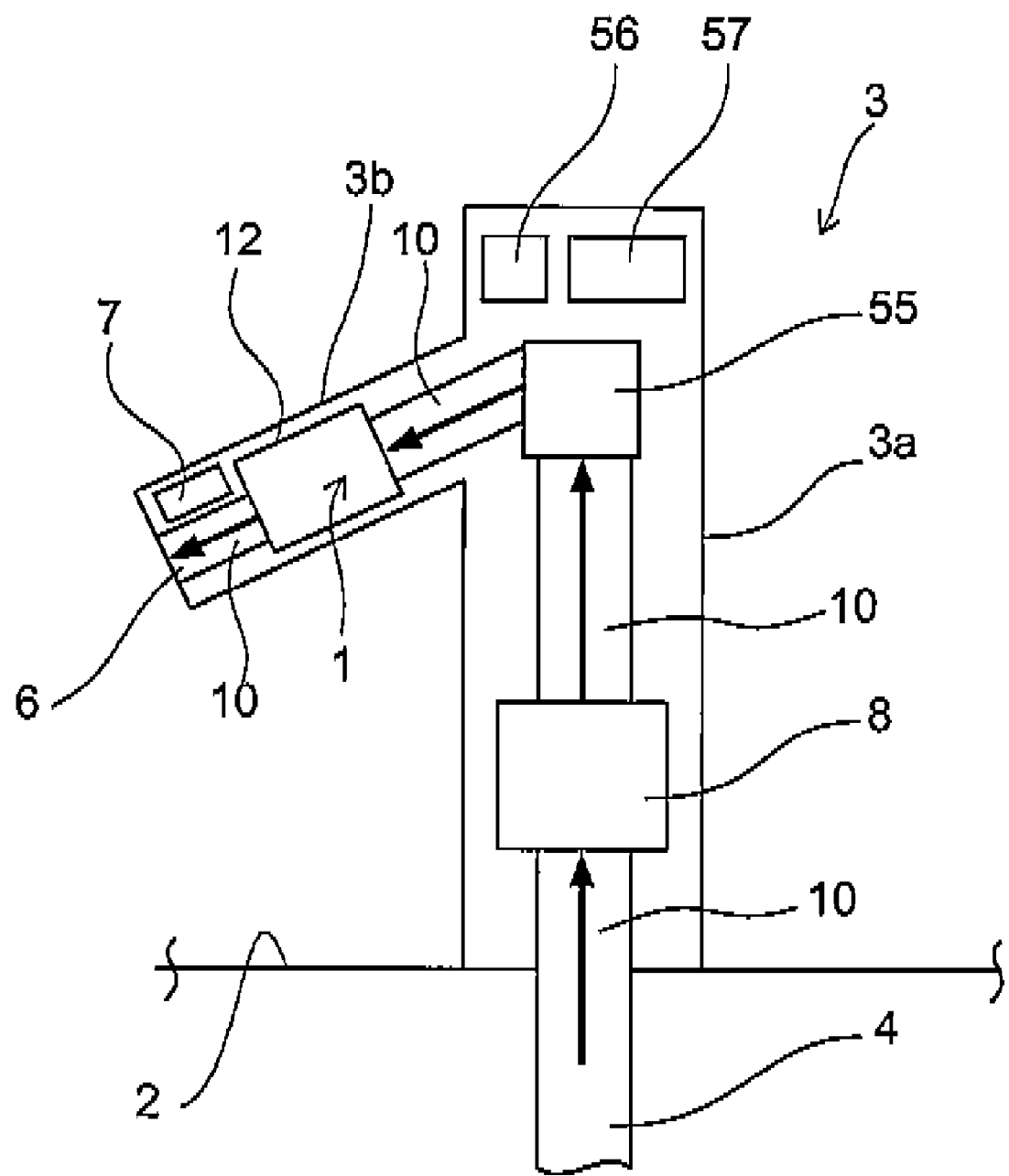
FIG. 3 is a schematic sectional view illustrating the automatic faucet apparatus including the generator of the embodiment of the invention.

FIG. 3 is a schematic sectional view illustrating the automatic faucet apparatus including the generator of the embodiment of the invention.

In the figures, the arrows indicate the direction of flowing water.

The automatic faucet apparatus 3 is mounted in, for example, a washstand 2. The automatic faucet apparatus 3 is connected to a water inflow port 5 for tap water or the like, through a piping 4. The automatic faucet apparatus 3 has a cylindrical body 3*a*, and a water discharger 3*b* which is disposed in an upper portion of the body 3*a*, and which extends in a radially outward direction of the body 3*a*. A water discharging port 6 is formed at the tip end of the water discharger 3*b*, and a sensor 7 is incorporated in the vicinity of the water discharging port 6.

A water supply channel 10 which guides water that inflows from the water inflow port 5 and flows through the piping 4, to the water discharging port 6 is formed inside the automatic faucet apparatus 3. The body 3*a* incorporates a solenoid valve 8 which opens and closes the water supply channel 10, and, on the downstream side of the solenoid valve 8, a constant flow valve 55 which restricts the amount of water discharge to a constant value. In the case where the water supply pressure of tap water or the like is higher than the use pressure, a reducing valve or regulating valve which is not shown may be incorporated in the upstream side of the solenoid valve 8 in order to reduce the water supply pressure. The constant flow valve 55, the reducing valve, and the regulating valve may be adequately disposed as required.

The generator 1 is disposed inside the water discharger 3*b*, and in the water supply channel 10 on the downstream side of the constant flow valve 55. A charger 56 which stores the power generated by the generator 1, and a controller 57 which controls the driving of the sensor 7 and the opening and closing operations of the solenoid valve 8 are disposed inside the body 3*a*. Since the generator 1 is disposed downstream from the solenoid valve 8 and the constant flow valve 55, the water supply pressure (primary pressure) of the tap water does not directly act on the generator 1. Therefore, the generator 1 is not requested to have a high pressure tightness, and this arrangement is advantageous in reliability and cost.

The charger 56 and the controller 57 are connected to each other through wirings which are not shown, and placed at positions which are in an upper portion of the body 3*a* and above the highest position of the water supply channel 10. Even when a water drop due to condensation on the outer face of a channel piping forming the water supply channel 10 falls or flows down along the channel piping, therefore, it is possible to prevent the controller 57 from being submerged, and also a failure of the controller 57 from occurring. Similarly, also the charger 56 is disposed above the water supply channel 10. Therefore, it is possible to prevent the charger 56 from being submerged, and also a failure of the charger 56 from occurring.

A coil 30 (see FIG. 5) disposed in the generator 1, and the controller 57 are connected to each other through wirings which are not shown, thereby enabling the output of the coil 30 to be sent to the charger 56 through the controller 57.

The faucet generator 1 is not restricted to be disposed inside faucet metal fittings (the body 3*a* and the water discharger 3*b*) of the faucet apparatus 3. For example, the faucet generator may be disposed in the piping (channel) 4 which connects between the faucet metal fittings of the faucet apparatus 3 and a stop cock (main cock) 105 (see FIG. 2) that is disposed upstream thereof.

The automatic faucet apparatus 3 is preferably used in a living environment. It is used as a kitchen faucet apparatus, a living and dining faucet apparatus, a shower faucet apparatus, a toilet faucet apparatus, and a lavatory faucet apparatus. The generator 1 of the this embodiment is not limited to the automatic facet apparatus 3 using a human body detection sensor, but is also applicable to a one-touch faucet apparatus which is manually switched on/off, a metering faucet apparatus which meters the flow and automatically stops discharging water, and a timed faucet apparatus which stops discharging water after a preset period of time has elapsed. The generated electric power may be used for illumination, generation of electrolyzed functional water such as alkali ion water and silver ion-containing water, flow rate display (metering), temperature displays and voice guidance.

In the automatic faucet apparatus 3, the discharge flow rate is illustratively set to 100 liters per minute or less, and preferably to 30 liters per minute or less. In particular, in the lavatory faucet, it is preferably set to 5 liters per minute or less. In the case of relatively high discharge flow rate such as in toilet faucet, it is preferable that the water flow to the generator 1 be branched from the water supply pipe to regulate the flow rate through the generator 1 to 30 liters per minute or less. This is because, if the water flow from the water supply pipe is entirely passed through the generator 1, the number of revolutions of the rotor vane 15 in the generator 1 increases, causing concern about the possibility of increasing noise and shaft wear. Furthermore, above an appropriate number of revolutions, the amount of power generation does not increase despite the increase of the number of revolutions, because of energy loss due to eddy current and coil heating. In Japan, for example, the water pressure of a water pipe to which the faucet apparatus is mounted may be sometimes as low as about 0.05 (MPa).

Then, referring again to FIGS. 1 and 4, the generator 1 will be described.

The cylindrical body 13 has a stepped shape consisting of a small-diameter portion 13a and a large-diameter portion 13b, and is disposed in the water discharger 3b which is shown in FIGS. 2 and 3, in a state where the interior of the cylindrical body communicates with the water supply channel. In this case, the cylindrical body is disposed in such a manner that the center axis direction of the cylindrical body 13 is substantially parallel to the direction of flowing water, the small-diameter portion 13a is directed toward the upstream side, and the large-diameter portion 13b is directed toward the downstream side.

In the cylindrical body 13, in the sequence starting from the upstream side, the pre-rotation stator vane 14, the rotor vane 15, and the bearing 17 are disposed. The pre-rotation stator vane 14 is disposed inside the small-diameter portion 13a, and the rotor vane 15 and the bearing 17 are disposed inside the large-diameter portion 13b.

The opening at the downstream end of the large-diameter portion 13b is liquid-tightly closed by the sealing member 51 through an O-ring 52. A stepped hole is disposed inside the sealing member 51. A step portion 51a of the member is annularly formed, and the bearing 17 is supported on the step portion 51a.

The pre-rotation stator vane 14 has a shape in which a conical member is disposed integrally on one end face (the face positioned on the upstream side) of a columnar member. A plurality of projective stator vane blades IS which are projected in a radially outward direction are disposed on the circumferential face of the pre-rotation stator vane 14. The stator vane blades 18 are inclined from the upstream side toward the downstream side while being twisted in the rightward direction about the axis center of the pre-rotation stator vane 14. Each space which is between the stator vane blades 18 that are adjacent to each other in the circumferential direction functions as a stator vane channel 71. The pre-rotation stator vane 14 is fixed to the cylindrical body 13, and is not rotated.

The rotor vane 15 is disposed on the downstream side of the pre-rotation stator vane 14. The rotor vane 15 has a columnar shape, and a plurality of projective rotor vane blades 19 which are projected in a radially outward direction are disposed on the circumferential face of the rotor vane. contrary to the stator vane blades 18, the rotor vane blades 19 are inclined from the upstream side toward the downstream side while being twisted in the leftward direction about the axis center. Each space which is between adjacent ones of the rotor vane blades 19 that are adjacent to each other in the circumferential direction functions as a rotor vane channel 72.

The bearing 17 includes: a ring member 21 which is fixed to the stepped hole of the sealing member 51; and a shaft supporting portion 22 which is disposed at the center of the ring member 21. The ring member 21 and the shaft supporting portion 22 are coupled to each other by coupling members 23 which are radially disposed. The gaps between the coupling members 23 are not closed, and are passed through the bearing. Therefore, the water flow inside the cylindrical body 13 is not disturbed.

A center shaft 24 which is fixed to the axis center of the rotor vane 15 is rotatably supported on the shaft supporting portion 22 of the bearing 17. A tip end portion of the center shaft 24 is projected from the rotor vane 15 to be fitted into the pre-rotation stator vane 14. The tip end portion of the center shaft 24 and the pre-rotation stator vane 14 are not fixed to each other, and the center shaft 24 is rotatable with respect to the pre-rotation stator vane 14. Alternatively, a configuration may be formed in which the both end portions of the center shaft 24 are fixed to the shaft supporting portion 22 and the pre-rotation stator vane 14, respectively, and the rotor vane 15 is rotatably fitted to the center shaft 24.

Namely, the rotor vane 15 having the rotor vane blades is disposed in the water supply channel so that the axial direction of the rotor vane 15 is substantially parallel to the water supply channel. Here, the axial direction of the rotor vane 15 is identical with the direction of the center shaft 24.

In the large-diameter portion 13b of the cylindrical body 13, an annular magnet M which is fixed to outer circumferential portions of the rotor vane blades 19 is housed so as to surround the rotor vane channels 72. Outside the small-diameter portion 13a of the cylindrical body 13, the stator 9 is disposed so as to be opposed to an end face which is on the upstream side of the magnet M, and which is substantially perpendicular to a radial direction.

The inner circumferential face of the magnet X which is indicated by the dash-dot-dot line in FIG. 4(a) is fixed to radially outward side end faces of the rotor vane blades 19.

The inner circumferential face of the rotor vane ring 15a which is indicated by the dash-dot line in FIG. 4(b) is fixed to radially outward side end faces of the rotor vane blades 19, and the inner circumferential face of the magnet M indicated by the dash-dot line is fixed to the outer circumferential face of the rotor vane ring 15a. The rotor vane ring 15a is not always required. In the case where the ring is disposed, however, the rotor vane 15 and the magnet M can be more firmly integrated with each other.

The water flow which is disposed to spread toward the outside because of the formation of a swirling flow can be guided by the inner circumferential face of the rotor vane ring 15a, or by, in the case where the rotor vane ring 15a is not provided, the inner circumferential face of the magnet M. Therefore, the wasted hydro energy can be reduced, and the energy conversion can be efficiently performed. In this case, the inner circumferential face of the rotor vane ring 15a, or, in the case where the rotor vane ring 15a is not provided, the inner circumferential face of the magnet M is not required to be disposed on the whole area of the rotor vane 15 which is substantially perpendicular to a radial direction, and is disposed at least on the upstream side of the rotor vane 15.

Namely, the rotor vane 15 is rotated by the force of the water flow which flows inside with respect to the inner circumferential face of the magnet M which is disposed so as to surround at least a rotor vane upstream portion that is a part of the rotor vane 15, or with respect to the inner circumferential face of the rotor vane ring 15a that is disposed between the inner circumferential face of the magnet M and the rotor vane 15.

The embodiment has the structure ("axial arrangement") where the stator 9 is opposed to the end face of the magnet M which is substantially perpendicular to a radial direction. In the embodiment, therefore, the radial dimension can be reduced as compared with the case where the stator 9 is opposed to the radially outside of the magnet M ("radial arrangement"). Furthermore, the radial dimension of the rotor vane 15 can be increased by a degree corresponding to the configuration in which the stator 9 is not disposed radially outside the rotor vane 15, so that the generated electricity amount can be increased.

In the case where the cylindrical body 13 is formed by a material having a low electrical conductivity, such as a resin, the eddy current loss can be reduced as compared with the case where the cylindrical body is formed by a metal, and hence the generated electricity amount can be further increased. In this case, only the large-diameter portion 13b through which magnetic fluxes are passed may be formed by a material having a low electrical conductivity, such as a resin.

Next, the magnet M and the stator 9 will be described.

Figure 5:
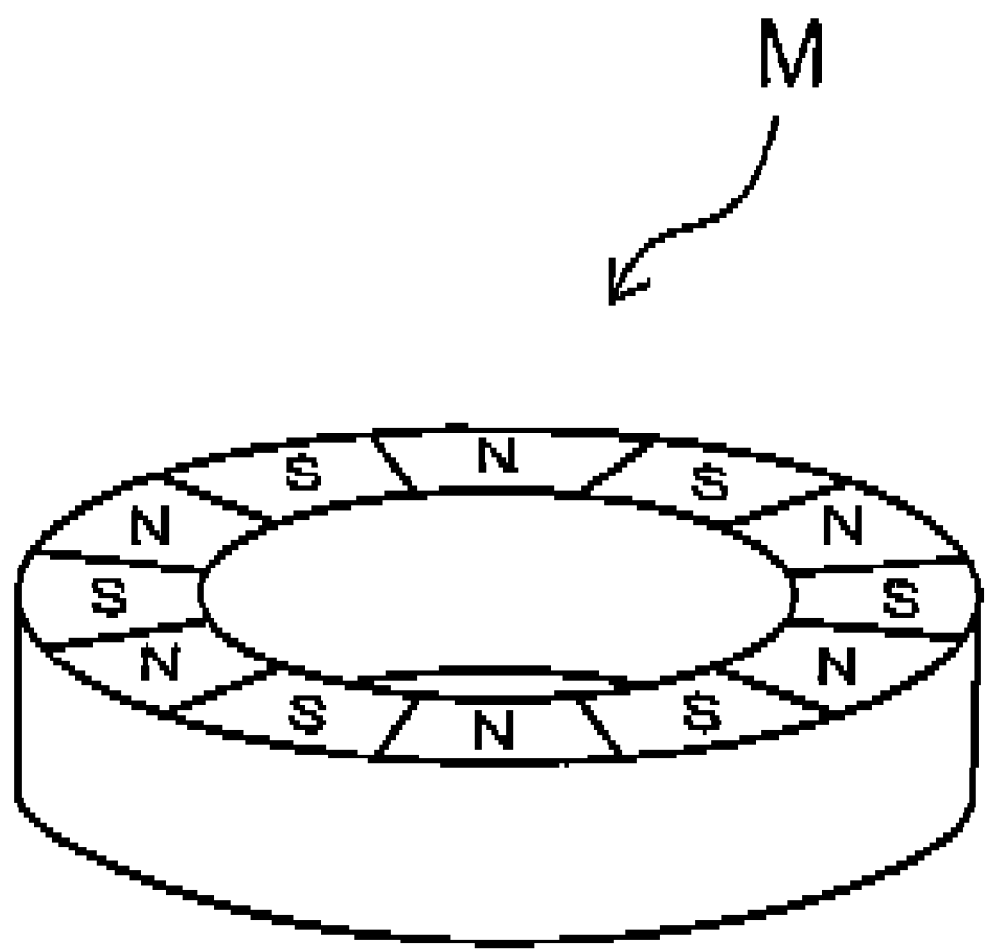
FIG. 5 is a schematic perspective view of a magnet.

FIG. 5 is a schematic perspective view of the magnet M.

Figure 6:
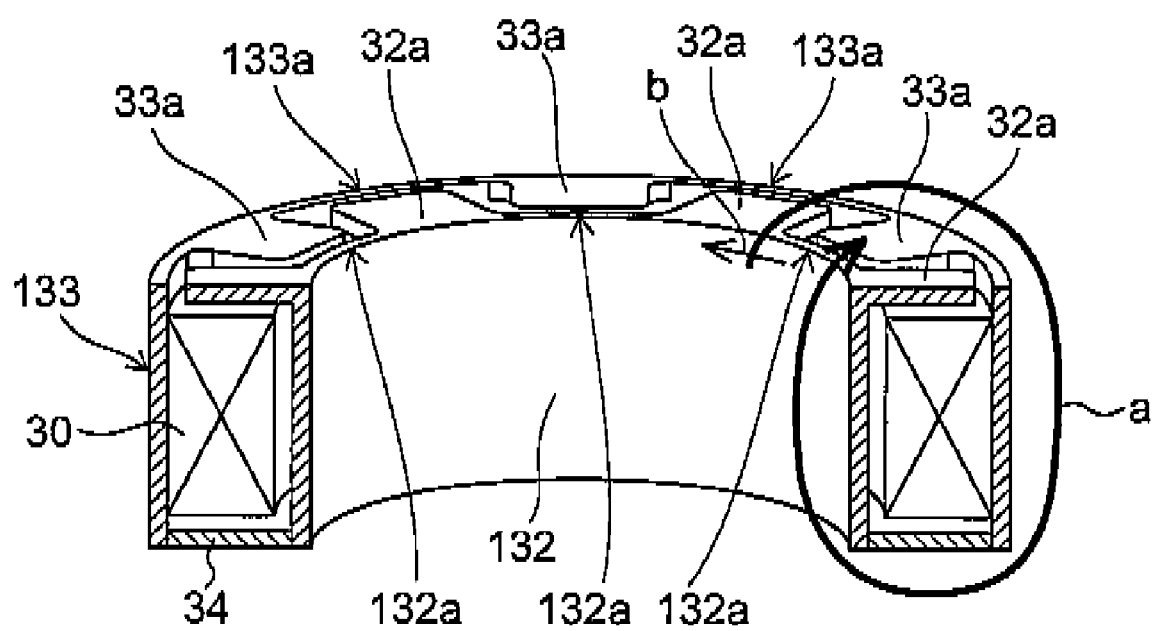
FIG. 6 is a schematic perspective sectional view of a stator in a comparative example.

FIG. 6 is a schematic perspective sectional view of a stator in a comparative example.

Figure 7:
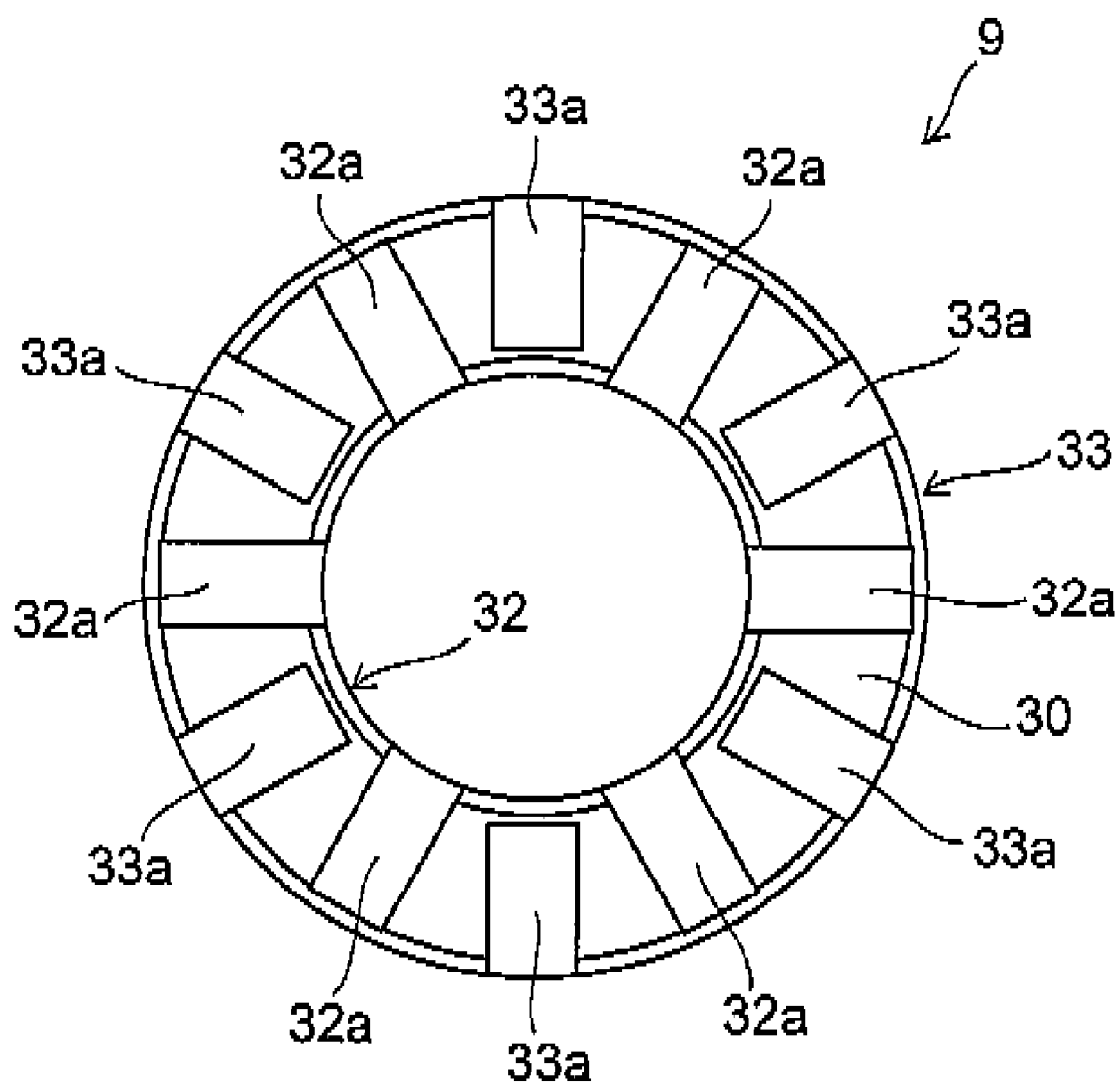
FIG. 7 is a schematic plan view of a stator in the generator of the embodiment of the invention.

FIG. 7 is a schematic plan view of the stator 9 in the generator of the embodiment of the invention.

Figure 8:
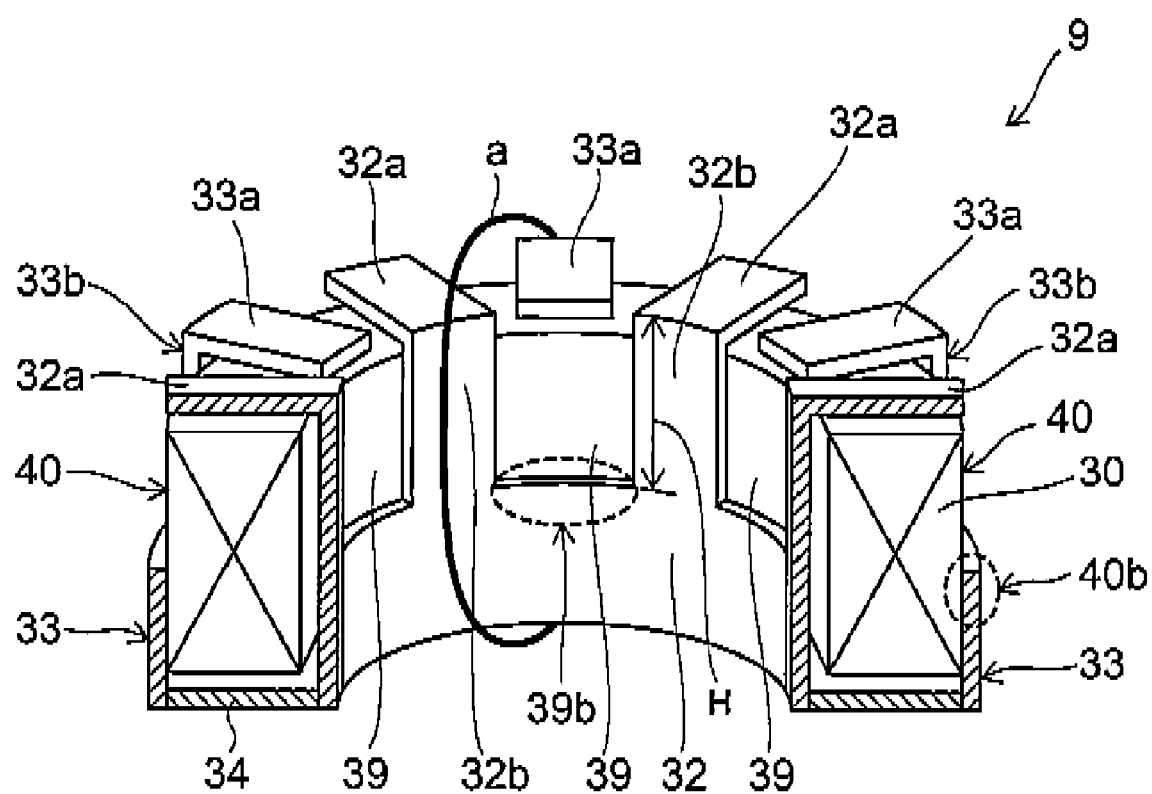
FIG. 8 is a schematic perspective sectional view of the stator in the generator of the embodiment of the invention.

FIG. 8 is a schematic perspective sectional view of the stator 9 in the generator of the embodiment of the invention.

As shown in FIG. 5, the end faces of the magnet M which are substantially perpendicular to a radial direction are alternately magnetized with N and S poles along the circumferential direction.

Outside the small-diameter portion 13a of the cylindrical body 13, the stator 9 is placed to be opposed to the upstream end face of the magnet M. Alternatively, the stator 9 may be placed to be opposed to the downstream end face of the magnet M, or to be opposed to the both upstream and downstream end faces of the magnet M.

FIG. 6 shows a stator which was studied in the course of performing the invention by the inventors. In a first yoke 132, a portion which is opposed to an inner circumferential face portion of the coil 30 is formed uninterruptedly or continuously in the circumferential direction. In a second yoke 133, similarly, a portion which is opposed to an outer circumferential face portion of the coil 30 is formed uninterruptedly or continuously in the circumferential direction. In this case, the inner diameter of the magnet M is approximately equal to that of the stator, and the outer diameter of the magnet M is approximately equal to that of the stator.

The magnet M which is opposed to inductors 32a that are continuously contacted with the first yoke 132, and also to inductors 33a that are continuously contacted with the second yoke 133 magnetizes the inductors 32a, 33a, so that an interlinking magnetic path a surrounding the coil 30 is formed.

In the configuration of the comparative example, the circumferential faces of the inductors 32a, 33a are formed uninterruptedly or continuously, and hence also yoke portions 132a, 133a in the vicinity of tip ends of the inductors 32a, 33a are easily magnetized. The portion (yoke portion 132a or 133a) of each of the yokes is magnetized to a polarity which is opposite to that of the adjacent inductor, whereby a magnetic path short-circuit b is formed between the adjacent inductors. In the case where the magnetic path short-circuit b is formed, there is a problem in that the formation of the interlinking magnetic path a which contributes to electricity generation is impeded to reduce the coil efficiency, the generated electricity amount, and the like.

As a result of studies, the inventors has found the followings. When, in order to prevent the vicinity of the tip end of each inductor from being magnetized, a portion which is in one end of the yoke that is on the side where the inductor is disposed, and which is in the vicinity of the tip end of the inductor is caused to relatively recede from a magnetic inducible area 41 (which will be described later) of the magnet M, formation of a short-circuited magnetic path is impeded, and hence improvement of the coil efficiency, increase of the generated electricity amount, and the like can be realized.

In order to attain this, in a yoke, for example, a cutaway portion (space) which is formed by cutting away a portion that is on the side of one end where an inductor is disposed, and that is in the vicinity of the tip end of the inductor is disposed in a portion opposed to a circumferential face portion of a coil.

As shown in FIGS. 7 and 8, the stator 9 has: first to third yokes 32 to 34 all of which are made of a soft magnetic material (for example, rolled steel); the inductors 32a, 33a which are continuously contacted with the yokes; and the coil 30 which is placed in a space surrounded by the first to third yokes 32 to 34 and the inductors 32a, 33a.

The stator 9 has: the coil 30 which is disposed to be opposed to the end face of the magnet M that is substantially perpendicular to a radial direction; the plurality of inductors 32a, 33a which are placed separately from one another along the circumferential direction between the end face of the magnet M and the coil 30; and the first to third yokes 32 to 34 which are continuously contacted with the inductors 32a, 33a, and which are disposed to surround the coil 30, and which are made of a soft magnetic material.

In the coil 30 which is annularly wound, an inner circumferential face portion, an outer circumferential face portion, and both end face portions which are substantially perpendicular to a radial direction are surrounded by the first to third yokes 32 to 34 and the inductors 32a, 33a.

The first yoke 32 is placed inside the coil 30, and has a substantially annular shape. The plurality of inductors 32a are integrally disposed toward the radially outer side, in one end portion of the first yoke which is substantially perpendicular to a radial direction. In the first yoke 32, a portion which is opposed to the inner circumferential face portion of the coil 30 is substantially perpendicular to the inductors 32a. The inductors 32a are placed at regular intervals along the circumferential direction.

The second yoke 33 is placed so as to surround the outer circumferential face portion of the coil 30, and has a substantially annular shape. The plurality of inductors 33a are integrally disposed toward the radially inner side, in one end portion of the second yoke which is substantially perpendicular to a radial direction. In the second yoke 33, a portion which is opposed to the outer circumferential face portion of the coil 30 is substantially perpendicular to the inductors 33a. The inductors 33a are placed at regular intervals along the circumferential direction, and between the inductors 32a which are continuously contacted with the first yoke 32. Namely, the inductors 32a which are continuously contacted with the first yoke 32, and the inductors 33a which are continuously contacted with the second yoke 33 are arranged alternately and separately in the circumferential direction. The inductors 32a, 33a are opposed to one end face portion of the coil 30. The one end face portion of the coil 30 is opposed to an end face of the magnet M across the inductors 32a, 33a and the cylindrical body 13.

The third yoke 34 is disposed to be opposed to the other end face portion of the coil 30, has a ring plate shape, and is coupled to the other end portions of the first and second yokes 32, 33 (the end portions opposite to those with which the inductors 32a, 33a are continuously contacted).

In the first yoke 32, cutaway portions 39 in which one end side where the inductors 32a are disposed is cut away in a recessed manner in a direction that is substantially perpendicular to a radial direction are intermittently formed along the circumferential direction, in a portion opposed to the inner circumferential face portion of the coil 30. In other words, in the portion opposed to the inner circumferential face portion of the coil 30, coupling portions 32b which are disposed integrally with the inductors 32a are intermittently formed along the circumferential direction. The cutaway portions 39 are intermittently formed in the circumferential direction correspondingly to the positions of the tip ends of the inductors 33a which are continuously contacted with the second yoke 33.

Similarly, in the second yoke 33, cutaway portions 40 in which one end side where the inductors 33a are disposed is cut away in a recessed manner in a direction that is substantially perpendicular to a radial direction are intermittently formed along the circumferential direction, in a portion opposed to the outer circumferential face portion of the coil 30. In other words, in the portion opposed to the outer circumferential face portion of the coil 30, coupling portions 33b which are disposed integrally with the inductors 33a are intermittently formed along the circumferential direction. The cutaway portions 40 are intermittently formed in the circumferential direction correspondingly to the positions of the tip ends of the inductors 32a which are continuously contacted with the first yoke 32.

Next, the cutaway portions will be described.

Figure 9:
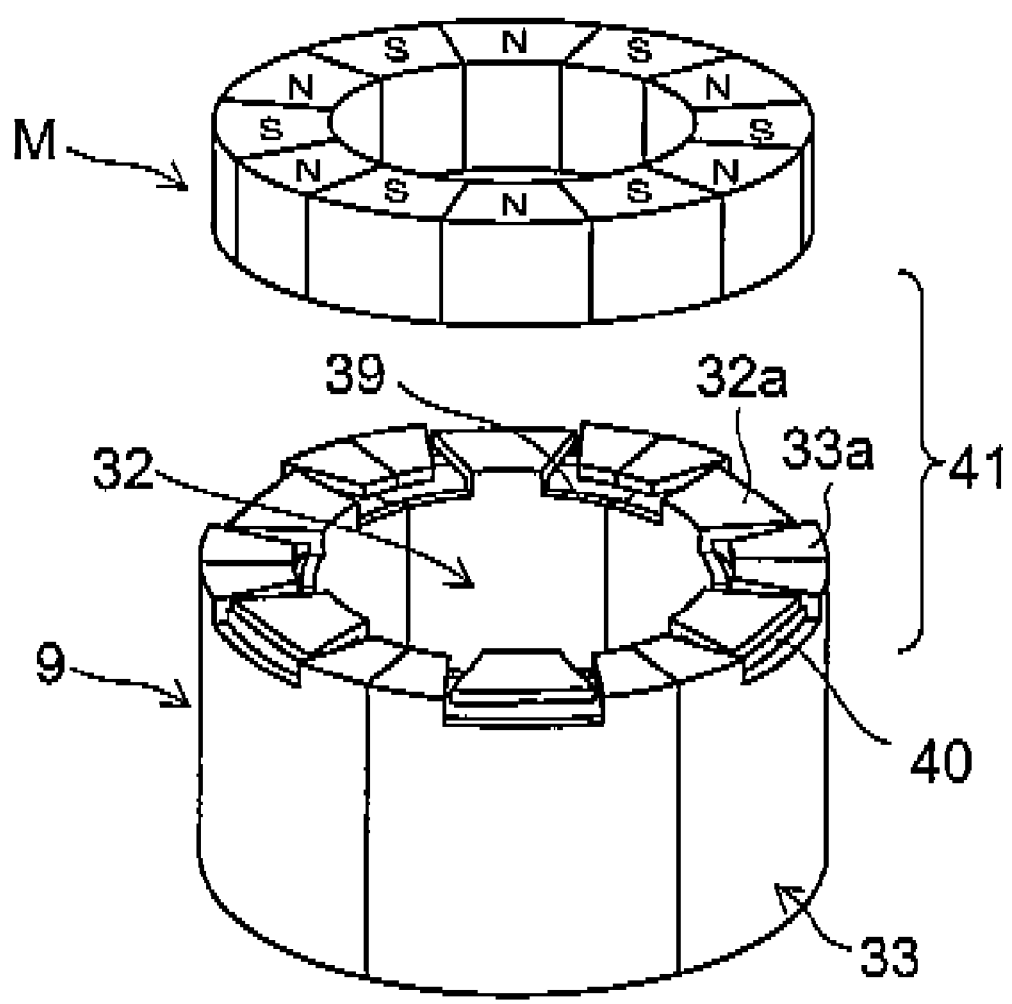
FIG. 9 is a schematic perspective exploded view illustrating magnetization of a yoke portion in the vicinity of tip ends of inductors.

FIG. 9 is a schematic perspective exploded view illustrating magnetization of a yoke portion in the vicinity of tip ends of the inductors.

Figure 10:
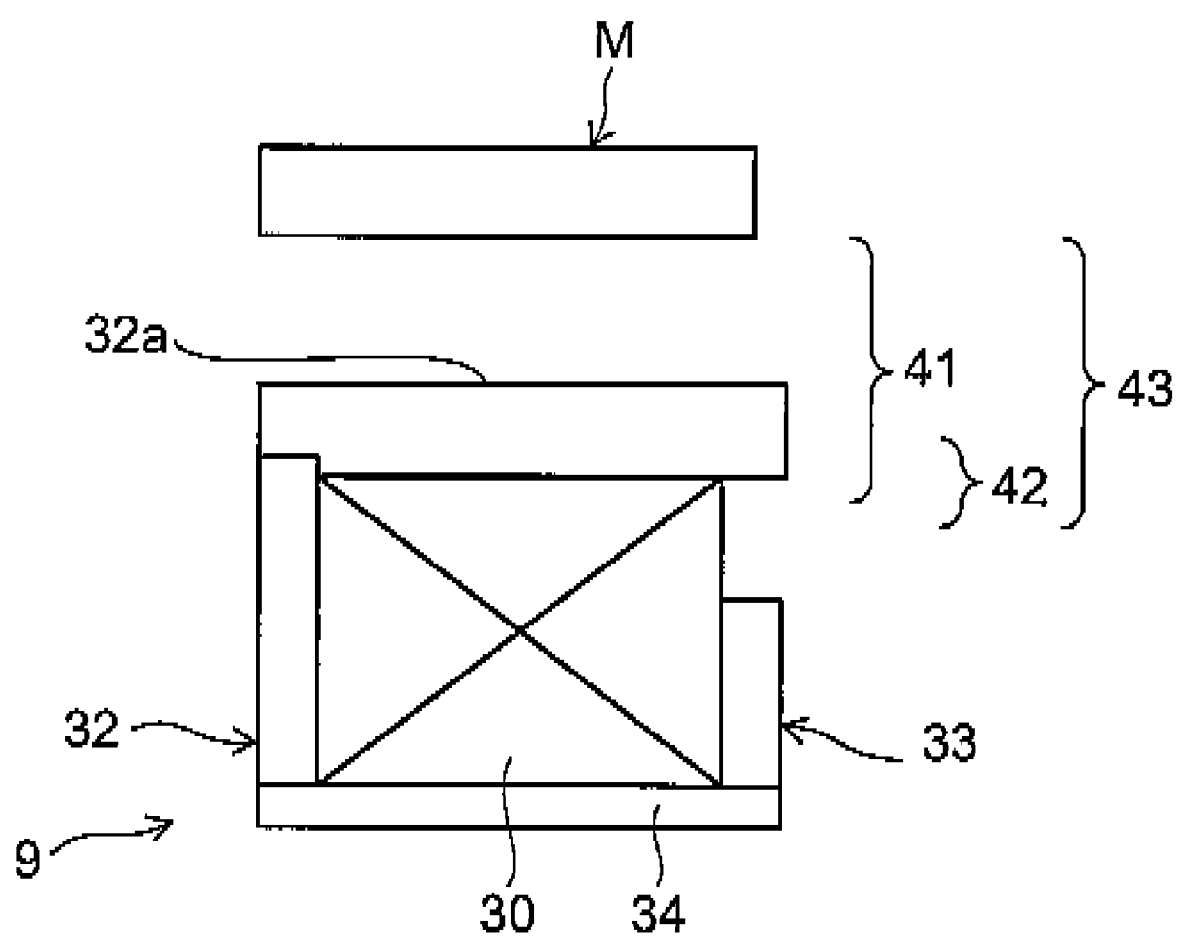
FIG. 10 is a schematic perspective sectional view of a stator portion.

FIG. 10 is a schematic perspective sectional view of a stator portion.

The components which are identical with those of Figs. 7 and 8 are denoted by the same reference numerals, and their description is omitted.

As shown in FIG. 9, the end faces of the magnet M which are substantially perpendicular to a radial direction are alternately magnetized with N and S poles along the circumferential direction at the intervals which are identical with those of the inductors. In the inductors 32a, 33a which are disposed to be opposed to the end face of the magnet M, therefore, magnetic poles which are opposite to those of the magnet M that is immediately above the inductors are generated. For example, an N pole is generated in an inductor which immediately below an S pole of the magnet M.

In this case, as described with reference to FIG. 6, when there is a yoke (soft magnetic material) in an area (magnetic inducible area) 41 where magnetism is induced by the magnet M, the portion is magnetized and the same magnetic pole as that which is generated in an inductor is generated. In the stator described with reference to FIG. 6, namely, magnetic poles are generated also in the yoke portions 132a, 133a in the vicinity of tip ends of the inductors 32a, 33a. In this case, opposite magnetic poles are generated in the adjacent inductors 32a, 33a, and hence a magnetic path short-circuit is formed between the adjacent inductors 32a, 33a, so that the formation of the interlinking magnetic path a which contributes to electricity generation is impeded.

The magnetic inducible area 41 may be referred to also as a region where the soft magnetic material can be magnetized by the magnet M, or a region where magnetic poles can be generated in the soft magnetic material by the magnet M.

As shown in FIG. 10, an area 42 where magnetism is induced by a magnetized inductor is added. Depending on the strength of the magnet M or the magnetization state of the inductor, therefore, magnetic poles may be generated in wider areas in the vicinity of the tip ends of the inductors 32a, 33a. In the specification, the area to which the area 42 where magnetism is induced by a magnetized inductor is added to the magnetic inducible area 41 is called a substantial magnetic inducible area 43.

The area 42 where magnetism is induced by a magnetized inductor is narrow as compared with the magnetic inducible area (the area where magnetism is induced by the magnet M) 41. Usually, therefore, the magnetic inducible area 41 is considered.

Although, for the sake of convenience in description, the outer circumferential face side of the stator has been described, also the inner circumferential face side of the stator is configured in a similar manner.

In the embodiment, as shown in FIGS. 8, 9, and 10, the cutaway portions 39, 40 are intermittently disposed in the circumferential face portions of the yokes 32, 33 in the circumferential direction correspondingly to the positions of the tip ends of the inductors of the other yoke, whereby a soft magnetic material is prevented from existing in the magnetic inducible area 41 and the substantial magnetic inducible area 43. The permeability of air is about several thousandths of that of a soft magnetic material. Even when only the cutaway portions 39, 40 are disposed, therefore, soft magnetic material regions 39b, 40b which are located immediately below the cutaway portions 39, 40 are hardly magnetized. More specifically, a case where N poles exist above the inductors 32a and S poles exist above the inductors 33a will be considered. In this case, the inductors 32a are magnetized with an S pole, and the inductors 33a are magnetized with an N pole. However, the soft magnetic material regions 39b which are located immediately below the inductors 33a are hardly magnetized with an N pole because the regions are opposed through the cutaway portions 39 configured by air. Therefore, a magnetic path short-circuit which is directed from each of the inductors 32a toward the corresponding sort magnetic material region 39b is hardly formed. Similarly, also a magnetic path short-circuit which is directed from each of the inductors 33a toward the corresponding soft magnetic material region 40b is hardly formed. Consequently, the formation of the interlinking magnetic path a which contributes to electricity generation can be suppressed from being impeded. As a result, improvement of the coil efficiency, and increase of the generated electricity amount can be realized.

Next, the depth H (the length from the end portion where each of the inductors 32a, 33a is disposed, in a direction that is substantially perpendicular to a radial direction, see FIG. 8) of the cutaway portions will be described.

Figure 11:
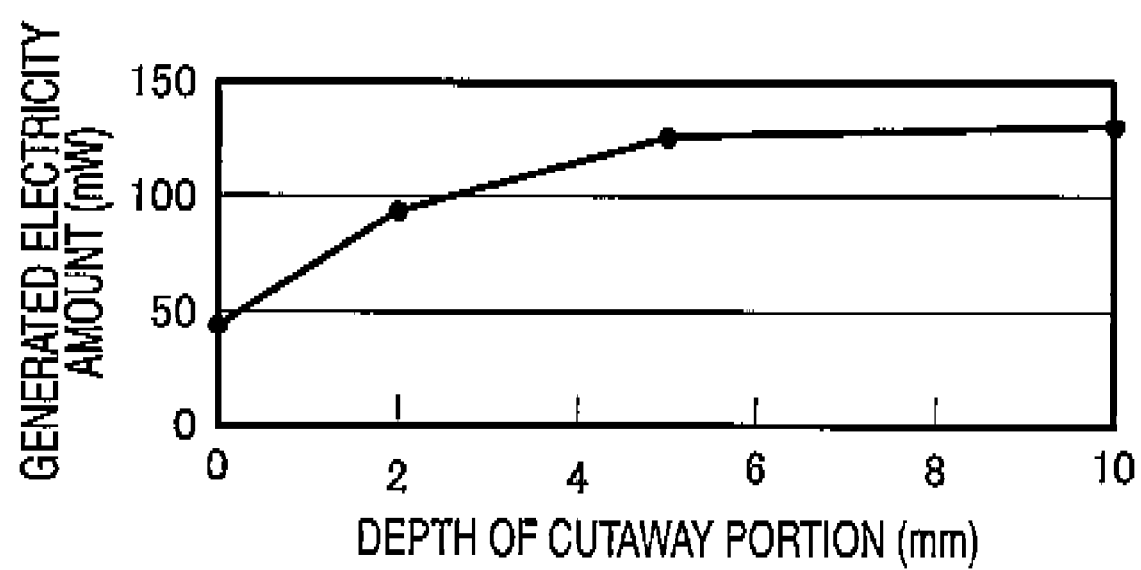
FIG. 11 is a graph showing relationships between the depth of cutaway portions and the generated electricity amount.

FIG. 11 is a graph showing relationships between the depth H of the cutaway portions 39 and the generated electricity amount. The abscissa indicates the depth H (mm) of the cutaway portions 39, and the ordinate indicates the generated electricity amount (mW).

Figure 12:
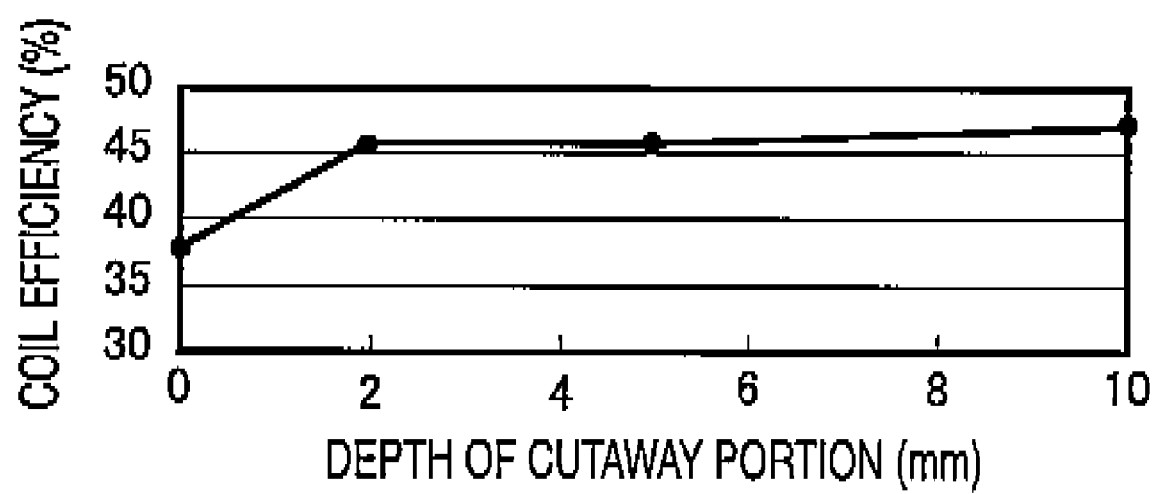
FIG. 12 is a graph showing relationships between the depth of the cutaway portions and the coil efficiency.

FIG. 12 is a graph showing relationships between the depth H of the cutaway portions 39 and the coil efficiency. The abscissa indicates the depth H (mm) of the cutaway portions 39, and the ordinate indicates the coil efficiency (%).

FIGS. 11 and 12 show results of simulations of the generated electricity amount and the coil efficiency in which the depth H (the length from the end portion where each of the inductors 32a, 33a is disposed, in a direction that is substantially perpendicular to a radial direction) of the cutaway portions 39 was changed to 0 (mm), 2 (mm), 5 (mm), and 10 (mm). The coil efficiency indicates the rate (%) of the output (the generated electricity amount) with respect to the input (the torque in the magnet M×number of rotations). The dimension of the whole stator 9 in a direction which in substantially perpendicular to a radial direction is set to 10.5 (mm). The configuration where the depth H of the cutaway portions 39 is 0 (mm) means the case of the comparative example which is shown in FIG. 6, and in which the cutaway portions 39 are not disposed.

From these results, it is seen that, when the depth H of the cutaway portions 39 is made large, the generated electricity amount can be increased, and the coil efficiency can be improved.

Although, for the sake of convenience in description, the cutaway portions 39 have been described, also the cutaway portions 40 are configured in a similar manner.

Figure 13:
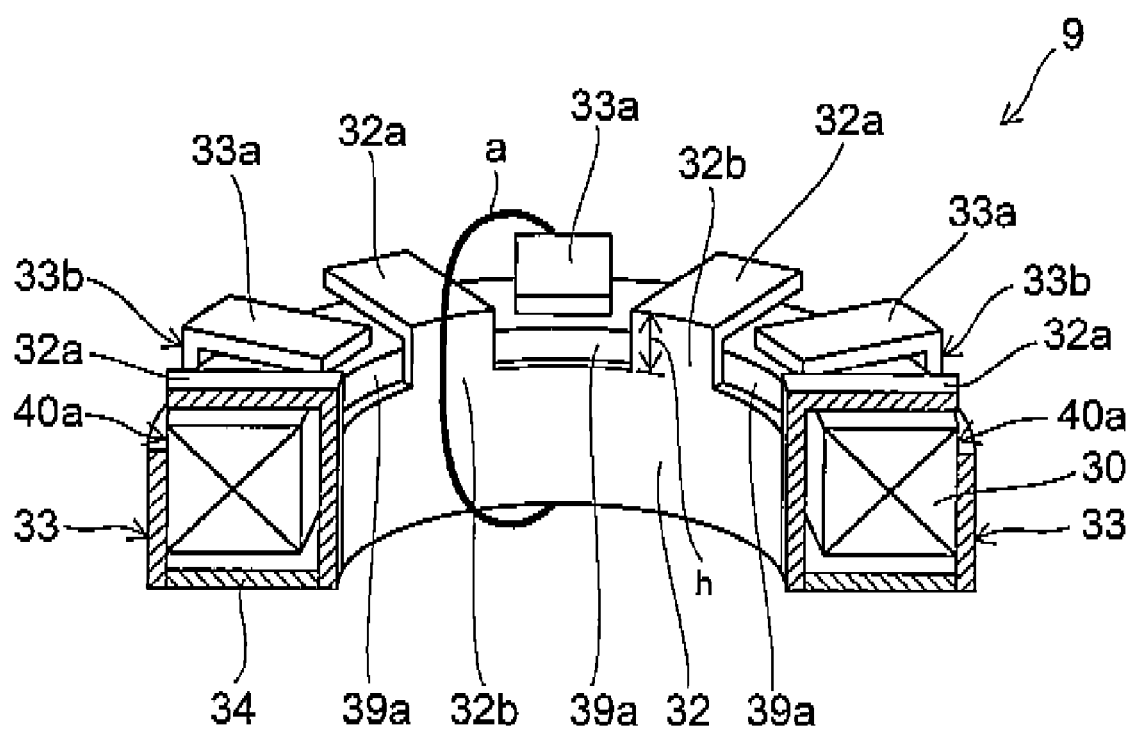
FIG. 13 is a schematic perspective sectional view exemplarily showing a stator having shallow cutaway portions.

From FIGS. 11 and 12, furthermore, it is seen that, even when a soft magnetic material exists in a part of the magnetic inducible area 41 and the substantial magnetic inducible area 43, the formation of the cutaway portions can produce an effect of increasing the generated electricity amount and improving the coil efficiency. This seems to be caused by the phenomenon where formation of even small cutaway portions causes the magnetic resistance to be largely increased by air, hence the soft magnetic material regions which are immediately below the cutaway portions are hardly magnetized, and formation of a magnetic path short-circuit can be correspondingly suppressed. Also when, as shown in FIG. 13, cutaway portions 39a, 40a having a depth h which is shallower than the cutaway portions 39, 40 which have been described with reference to FIG. 8 are formed, for example, formation of a magnetic path short-circuit can be suppressed.

From the viewpoint that formation of a magnetic path short-circuit is suppressed, it is preferable to dispose cutaway portions having a depth at which a soft magnetic material does not exist, at least in the magnetic inducible area 41. The magnetic inducible area 41 is affected by the strength of the magnet M. Namely, as the magnet M is stronger, the magnetic inducible area 41 is wider. The dimension of the magnetized yoke in the direction which is substantially perpendicular to a radial direction is longer as the dimensions between the end face of the magnet M and the inductors are shorter.

Therefore, the range of the magnetized yoke is changed depending on, for example, the intensity of the magnet M and placement position which are determined according to the use of the generator or the like. Strictly speaking, consequently, also the depth of the cutaway portions is preferably determined case-by-case and specifically.

When the cutaway portions are deep, the magnetic resistance of the interlinking magnetic path which circulates around the coil is increased. In a use where passage of many magnetic fluxes is preferred, therefore, it is preferable to shallow the cutaway portions. When the cutaway portions are shallow, the strength of the yoke is enhanced, and also the assembling property can be improved. In the case where the depth of the cutaway portions is approximately equal to the thickness of the inductors, the cutaway portions can function also as the runout for a process of bending the inductors, and hence a step of additionally processing the cutaway portions may be omitted.

According to findings obtained by the inventors, at least in a faucet generator, when cutaway portions having a depth which is larger than the dimension between the end face of the magnet M and the inductors are disposed, the formation of a magnetic path short-circuit can be effectively suppressed.

In above-described "axial arrangement", the diameter of a magnet can be made larger than that in "radial arrangement", and also magnetic fluxes can be correspondingly increased in principle. However, also an influence of the above-mentioned magnetic path short circuit is largely exerted. When the above-described cutaway portions are disposed, a magnetic path short circuit is suppressed, and the generated electricity amount and the coil efficiency can be improved. Moreover, the heat radiation through the cutaway portions can be expected, and therefore also the energy loss due to heat generation of the coil can be suppressed.

In the case of an automatic faucet including a generator, it is necessary to incorporate a solenoid valve and the generator, and hence the generator must be compactly formed. In order to make the generator compact, the efficiency of the generator must be improved. The effect due to the formation of cutaway portions as in the embodiment is large. Moreover, the formation of cutaway portions is effective also in suppression of the efficiency reduction due to heat generation.

In the above-described case, the inner diameter of the magnet M is approximately equal to that of the stator, and the outer diameter of the magnet M is approximately equal to that of the stator. Also in the case where the inner diameter and/or the outer diameter of the two components are not equal to each other, the formation of the above-described cutaway portions is sometimes preferable.

Next, another embodiment in which the one end of the yoke that is on the side where the inductors are disposed relatively recedes from the magnetic inducible area 41 of the magnet M will be described.

Figure 14:
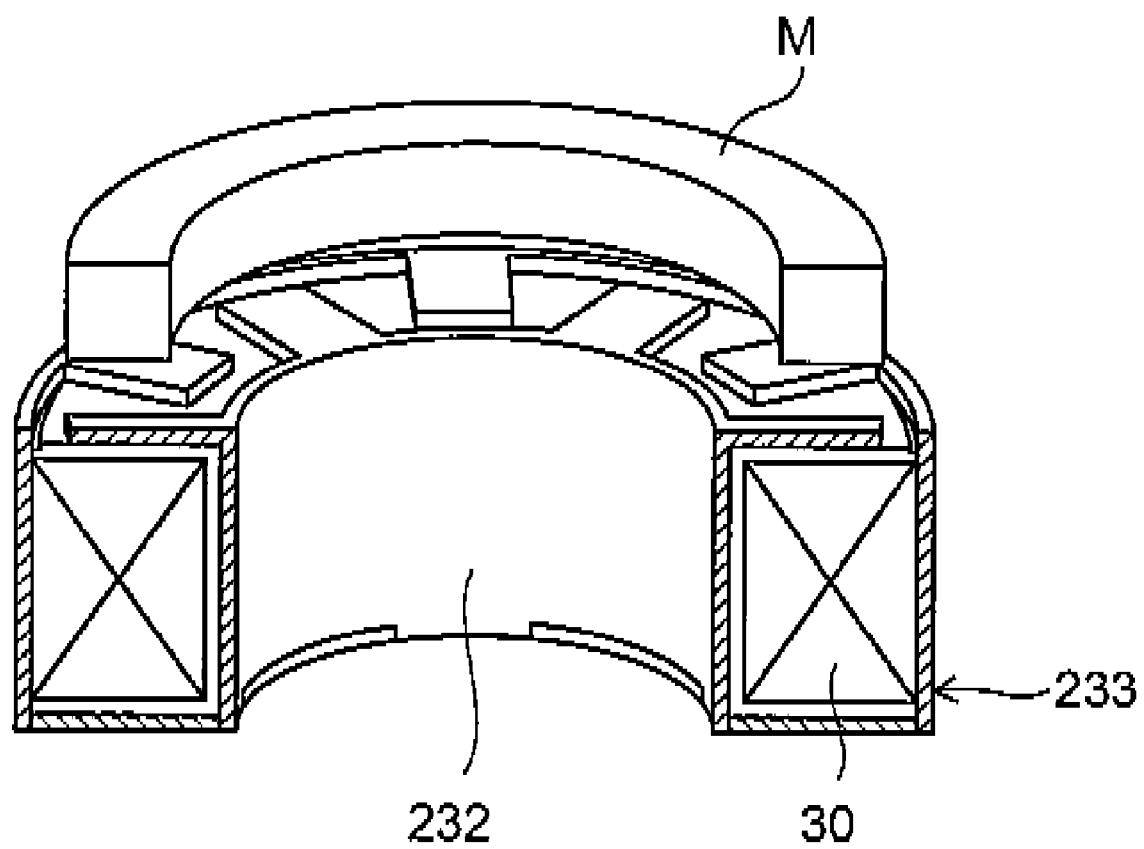
FIG. 14 is a schematic perspective sectional view illustrating a case where the inner diameter of the magnet is larger than that of the stator, and the outer diameter of the magnet is smaller than that of the stator.

FIG. 14 is a schematic perspective sectional view illustrating a case where the inner diameter of the magnet M is larger than that of the stator, and the outer diameter of the magnet M is smaller than that of the stator.

Figure 15:
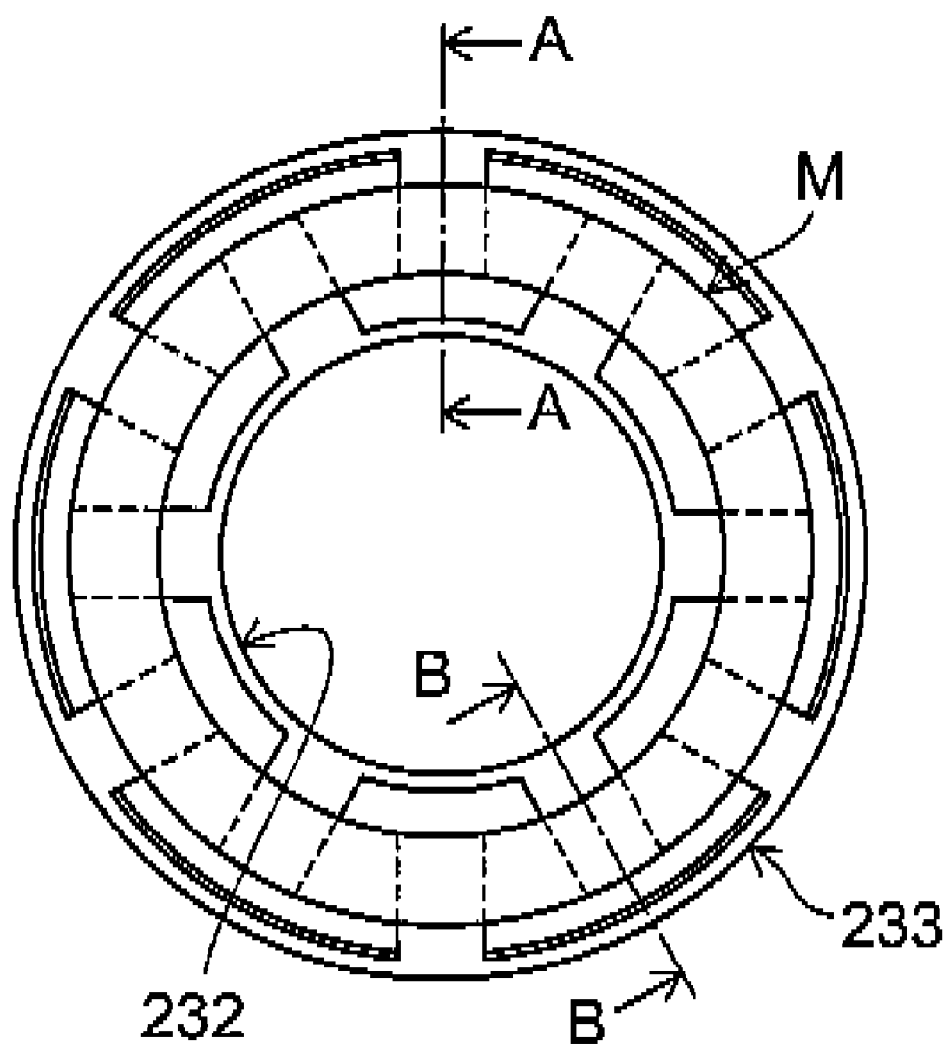
FIG. 15 is a schematic plan view as FIG. 14 is viewed from the upper side.
Figure 16:
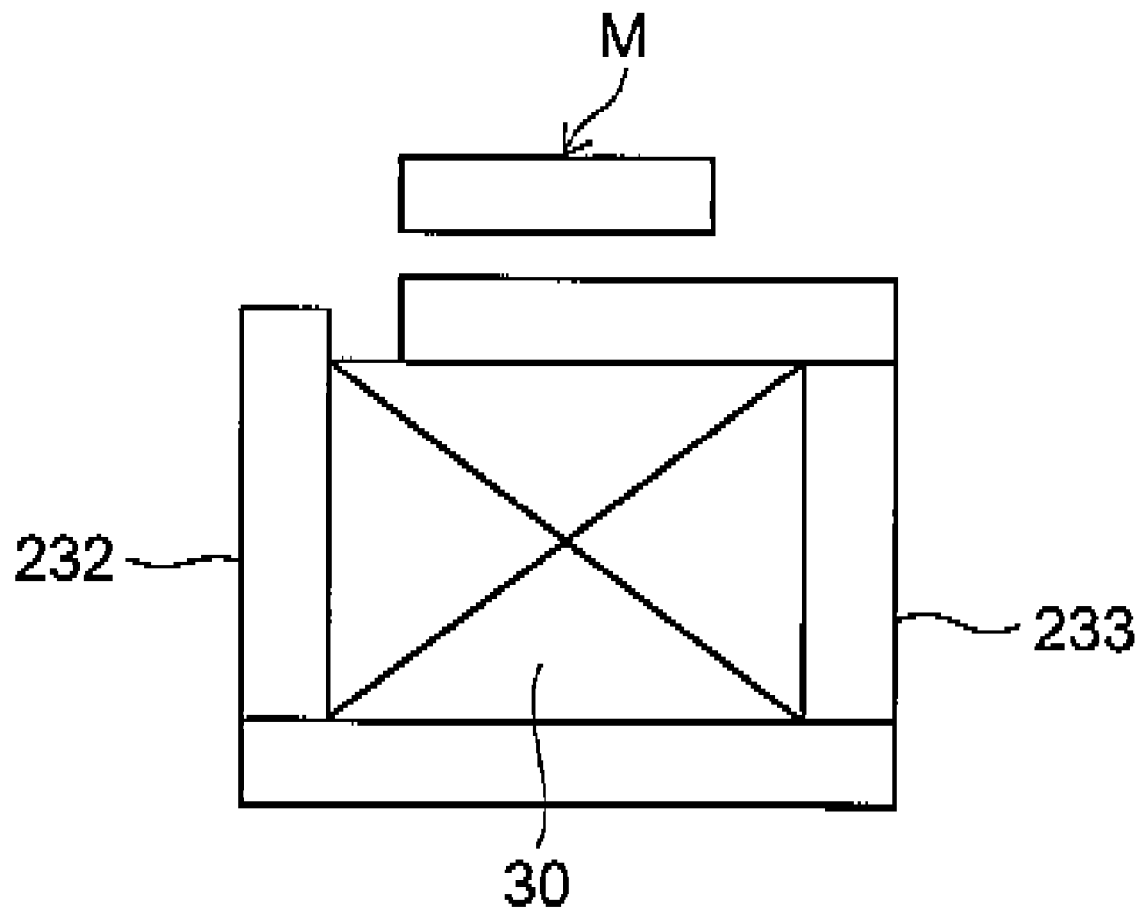
FIG. 16 is a sectional view looking in the direction of the arrow A-A in FIG. 15.
Figure 17:
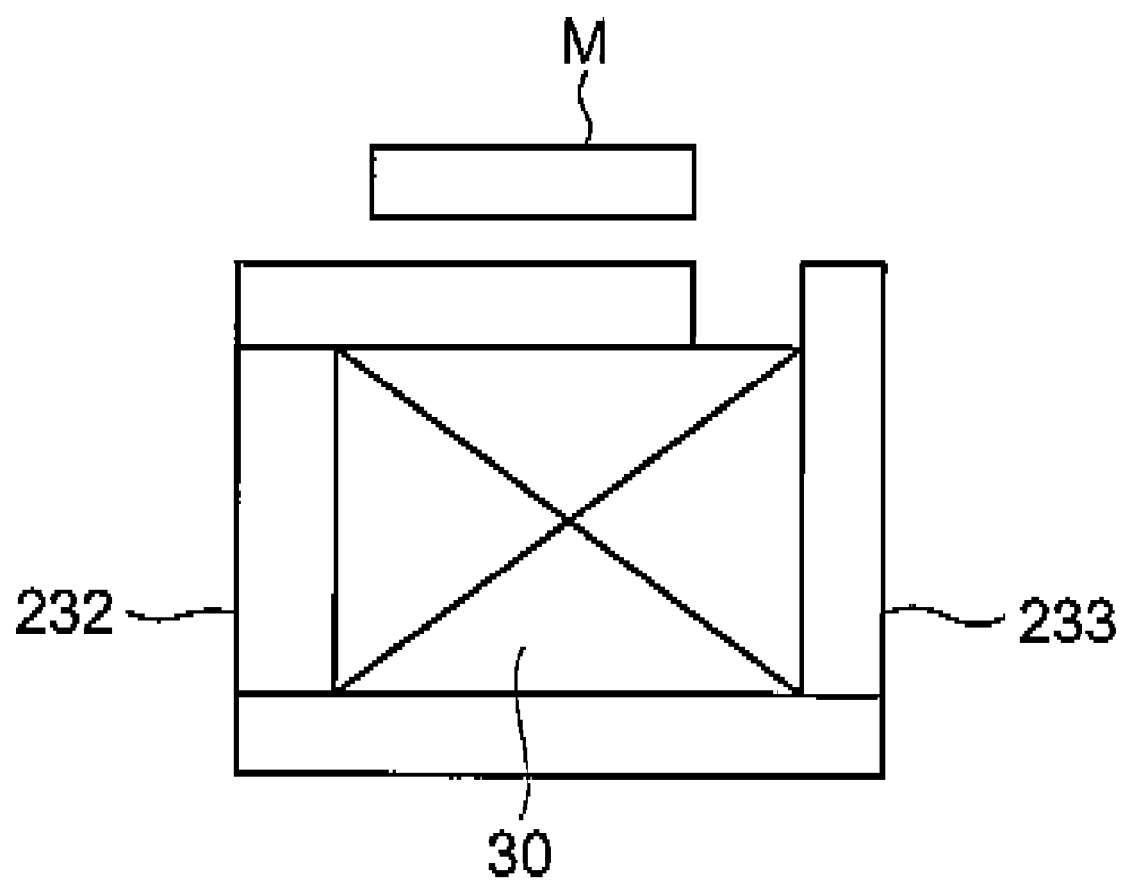
FIG. 17 is a sectional view looking in the direction of the arrow B-B in FIG. 15.

FIG. 15 is a schematic plan view as FIG. 14 is viewed from the upper side, FIG. 16 is a sectional view looking in the direction of the arrow A-A in FIG. 15 and FIG. 17 is a sectional view looking in the direction of the arrow B-B in FIG. 15.

In the embodiment, the inner diameter of the magnet M is larger than that of the stator, and the outer diameter of the magnet M is smaller than that of the stator, whereby portions which are in the one end of the yoke that is on the side where the inductors are disposed, and which are in the vicinity of the tip ends of the inductors are caused to relatively recede from the magnetic inducible area 41 of the magnet M.

As described above, the end faces of the magnet M which are substantially perpendicular to a radial direction are alternately magnetized with N and S poles along the circumferential direction at the intervals which are identical with those of the inductors. Although somewhat swollen, therefore, the magnetic field due to the magnet M is formed in the direction which is substantially perpendicular to a radial direction of the magnet M. Consequently, yokes 232, 233 are not directly included in the magnetic inducible area 41.

In this case, when, as shown in FIGS. 15 to 17, the tip end portions of the inductors are not projected from the inner or outer circumference of the magnet M, formation of a magnetic path short-circuit can be largely suppressed. The reason of this is that, while the magnetic fluxes generated by the magnet M are sufficiently received by the inductors, expansion of the magnetic inducible area due to the inductors can be suppressed.

According to the embodiment, it is not required to additionally dispose cutaway portions, and formation of a magnetic path short-circuit can be suppressed by the simple structure. Therefore, the embodiment is advantageous from the viewpoint of productivity.

Figure 18:
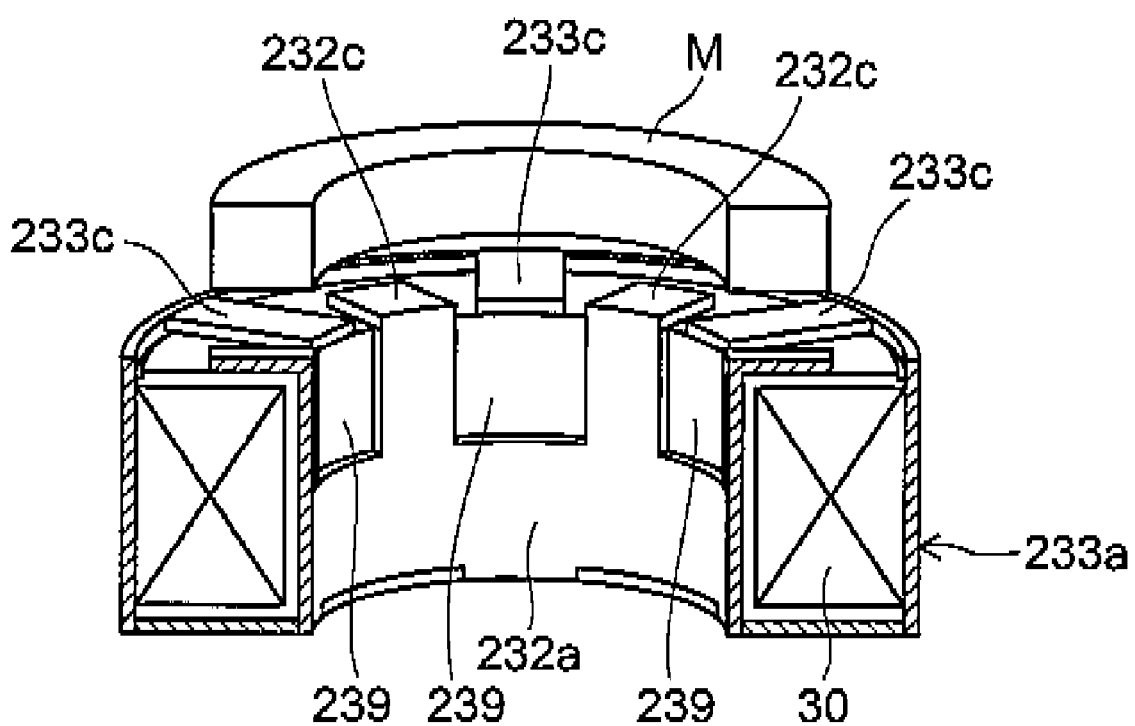
FIG. 18 is a schematic perspective sectional view illustrating a case where the inner diameter of the magnet is substantially equal to that of the stator, and the outer diameter of the magnet is smaller than that of the stator.

FIG. 18 is a schematic perspective sectional view illustrating a case where the inner diameter of the magnet M is substantially equal to that of the stator, and the outer diameter of the magnet M is smaller than that of the stator.

In this case, similarly with the cases of FIGS. 8 and 13, it is requested that cutaway portions 239 are disposed in a yoke 232a in the vicinity of tip ends of inductors 232c which are continuously contacted with a yoke 233a.

In the embodiment, namely, the outer diameter of the magnet M is smaller than that of the stator, and the cutaway portions 239 formed by cutting away portions on the side of one end where the inductors 232c are disposed and in the vicinity of tip ends of the inductors 232c are disposed in the yoke 232a provided in a portion on the side of the inner circumferential face of the magnet M, among yokes, whereby, in the one end of the yoke 232a which is on the side where the inductors 232c are disposed, portions in the vicinity of tip ends of the inductors 232c are caused to relatively recede from the magnetic inducible area 41 of the magnet M.

In this case, similarly with the case of FIG. 17, it is preferable to set the tip end portions of the inductors 232c which are continuously contacted with the yoke 232a, so as not to be projected from the outer circumference of the magnet M.

In the embodiment, the inner diameter of the magnet M is made smaller than that described with reference to FIG. 14. When the magnet M is inward expanded in this way, the surface area of the magnet M can be increased while suppressing a torque required for rotating the magnet M. As a result, the magnetic fluxes generated by the magnet M can be increased while suppressing a torque required for rotation.

Figure 19:
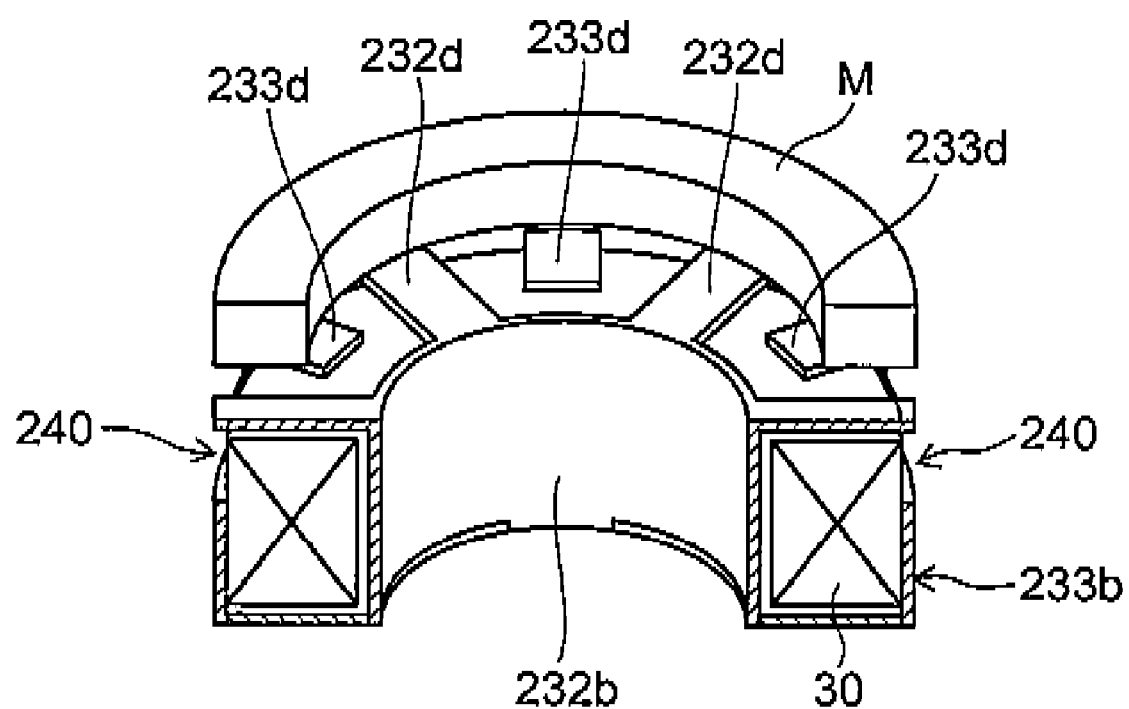
FIG. 19 is a schematic perspective sectional view illustrating a case where the outer diameter of the magnet is substantially equal to that of the stator, and the inner diameter of the magnet is larger than that of the stator.

FIG. 19 is a schematic perspective sectional view illustrating a case where the outer diameter of the magnet M is substantially equal to that of the stator, and the inner diameter of the magnet M is larger than that of the stator.

In this case, similarly with the cases of FIGS. 8 and 13, it is requested that cutaway portions 240 are disposed in a yoke 233b in the vicinity of tip ends of inductors 232d which are continuously contacted with a yoke 232b.

In the embodiment, namely, the inner diameter of the magnet M is larger than that of the stator, and the cutaway portions 240 formed by cutting away portions on the side of one end where the inductors 233d are disposed and in the vicinity of tip ends of the inductors 232d are disposed in the yoke 233b provided in a portion on the side of the outer circumferential face of the magnet M, among yokes, whereby, in the one end of the yoke 233b which is on the side where the inductors 233d are disposed, portions in the vicinity of tip ends of the inductors 232d are caused to relatively recede from the magnetic inducible area 41 of the magnet M.

In this case, similarly with the case of FIG. 16, it is preferable to set the tip end portions of the inductors 233d which are continuously contacted with the yoke 233b, so as not to be projected from the inner circumference of the magnet M.

In the embodiment, the outer diameter of the magnet M is made larger than that described with reference to FIG. 14. When the outer diameter of the magnet M is made larger in this way, the surface area can be increased by slightly increasing the diameter, and the magnetic fluxes generated by the magnet M can be correspondingly increased. Since the amount of magnetic fluxes is ensured in the outer side, the magnet M is not required to be inward expanded. Therefore, the diameter of the rotor vane blades can be made large, so that hydro energy can be effectively converted to rotational energy.

Next, the functions of the faucet generator and automatic faucet apparatus in the embodiment of the invention will be described.

When the user introduces a hand under the water discharging port 6 shown in FIGS. 2 and 3, the introduction is sensed by the sensor 7, and the solenoid valve 8 is opened by the controller 57. This causes flowing water to be supplied into the cylindrical body 13 of the generator 1, and the water flows inside the cylindrical body 13 to be discharged from the water discharging port 6. When the user removes the hand from area under the water discharging port 6, this is sensed by the sensor 7, and the solenoid valve 8 is closed by the controller 57 to automatically stop the water flow.

The flowing water flowing into the cylindrical body 13 flows over the surface of the conical member of the pre-rotation stator vane 14 to spread radially outward, and, in the embodiment shown in FIGS. 1 and 4, is formed as a swirling flow which swirls in the rightward direction about the axis center, to flow through the stator vane channels 71 between the stator vane blades 18.

The swirling flow which has flown through the stator vane channels 71 enters the rotor vane channels 72, and impinges on the upper inclined faces of the rotor vane blades 19. In the embodiment, the swirling flow entering the rotor vane channels 72 is a flow which swirls in the rightward direction about the axis center, and hence a rightward force acts on the rotor vane blades 19, so that the rotor vane 15 is rotated in the rightward direction. The flowing water which flows through the rotor vane channels 72 that are inside the inner circumferential face of the magnet M passes through the inside of the bearing 17, and then passes through the inside of the cylindrical body 13 to reach the water discharging port 6.

When the rotor vane 15 is rotated, also the magnet M fixed to the vane is rotated. As shown in FIG. 5, the end faces of the magnet M are alternately magnetized with N and S poles along the circumferential direction (rotational direction). When the magnet M is rotated, therefore, the polarities of the inductors 32a, 33a which are opposed to one of the end face of the magnet M, and those of the first and second yokes 32, 33 which are continuously contacted with the inductors are changed. As a result, the directions of interlinking magnetic fluxes with respect to the coil 30 are changed, and an electromotive force is produced in the coil 30, thereby performing electricity generation. The generated power is stored in the charger 56, and then used in the driving of, for example, the solenoid valve 8, the sensor 7, and the controller 57, and the like.

Next, a further embodiment in which inductors are disposed radially outside of a permanent magnet, and which has a stator where a coil is disposed so as to be opposed to an end face of the permanent magnet that is substantially perpendicular to a radial direction will be described.

First, the magnet M and the stator 9 will be described.

Figure 20:
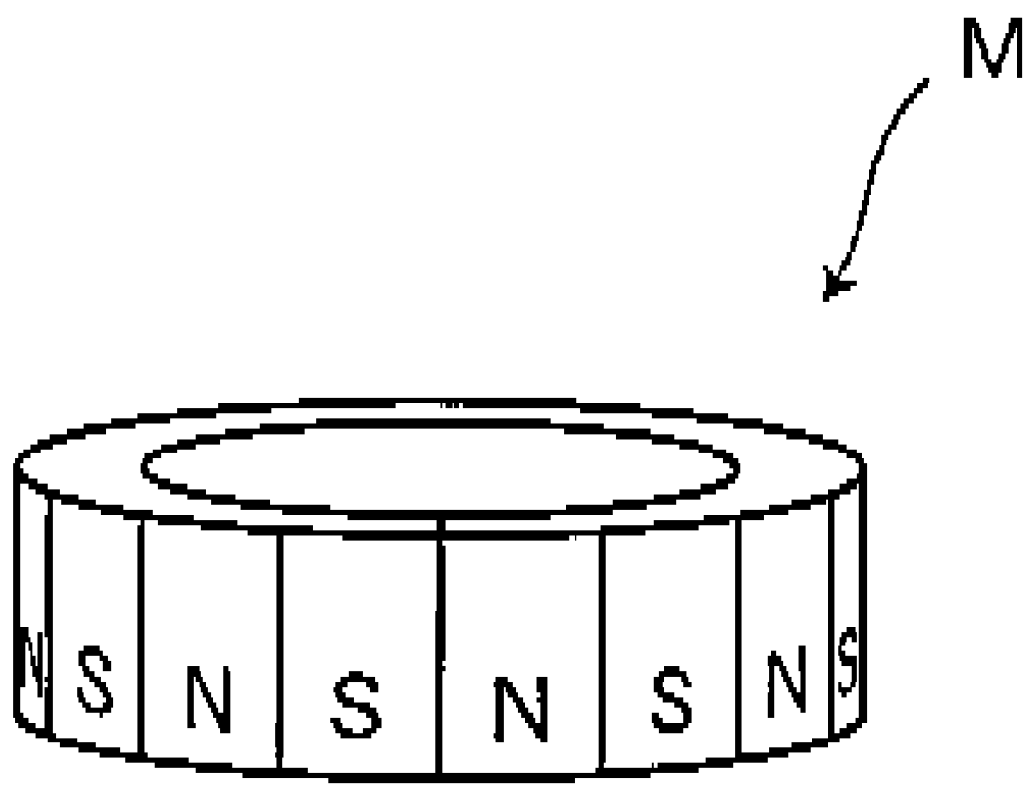
FIG. 20 is a schematic perspective view of a magnet or a further embodiment.

FIG. 20 is a schematic perspective view illustrating the magnet M.

Figure 21:
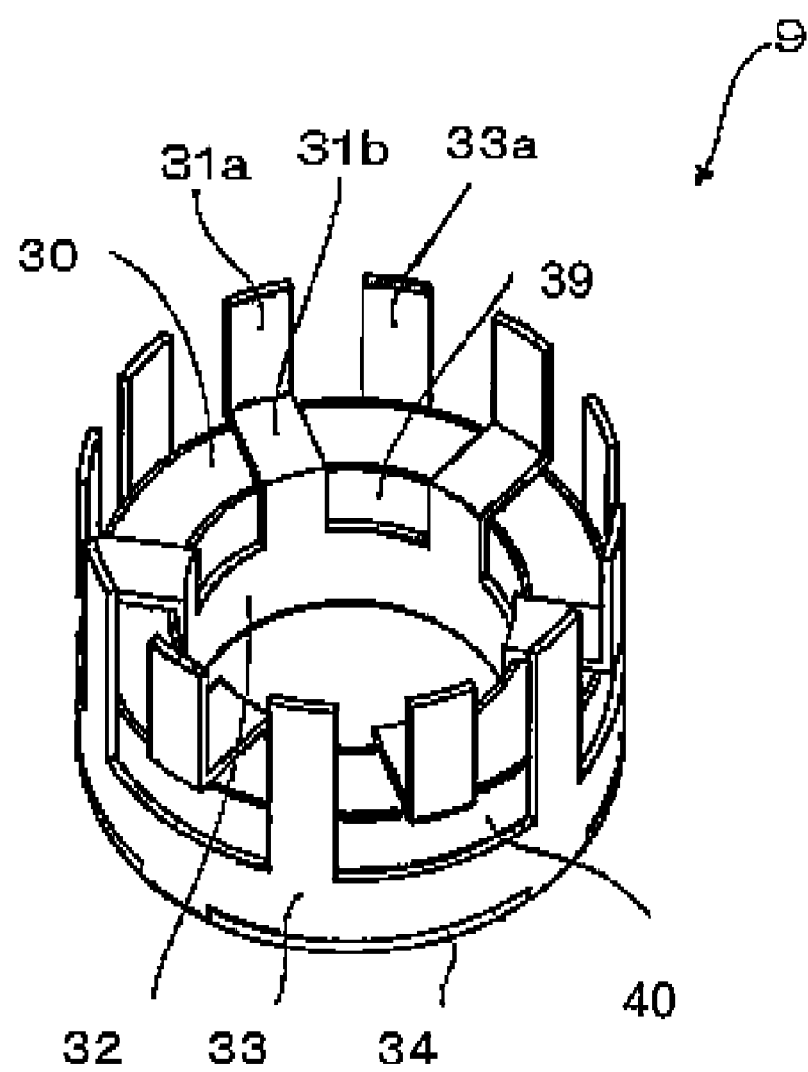
FIG. 21 is a schematic perspective view of a stator of the further embodiment.

FIG. 21 is a schematic perspective view illustrating the stator 9.

As shown in FIG. 20, the radial end face (outer circumferential face) of the magnet M is alternately magnetized with N and S poles along the circumferential direction.

The stator 9 has: the coil 30 which is disposed to be opposed to the end face of the magnet M that is substantially perpendicular to a radial direction; a plurality of inductors 31a, 33a which are placed separately from one another along the circumferential direction between the side face of the magnet M and the coil 30; and yokes 31b, 32, 33, 34 which are disposed to surround the coil 30, and which are made of a magnetic material.

In the coil 30 which is cylindrically wound, an inner circumferential face portion, an outer circumferential face portion, and both end face portions in the axial direction are surrounded by the yokes 31b, 32, 33, 34. All of the inductors 31a, 33a and yokes 31b, 32, 33, 34 are made of a magnetic material.

The first yoke 32 has a substantially cylindrical shape, and is placed so as to surround an inner circumferential face portion of the coil 30. The plurality of yokes 31b are integrally disposed toward the radially outer side, in one end portion of the yoke in the axial direction. In the first yoke 32, a portion which is opposed to the inner circumferential face portion of the coil 30 is substantially perpendicular to the yokes 31b. The yokes 31b are placed at regular intervals along the circumferential direction of the coil 30. Furthermore, the inductors 31a are disposed to extend in the axial direction of the coil 30, on one ends of the yokes 31b.

The second yoke 33 has a substantially cylindrical shape, and is placed so as to surround an outer circumferential face portion of the coil 30. The plurality of inductors 33a are integrally disposed toward the axial direction, in one end portion of the yoke in the axial direction.

The inductors 33a are placed at regular intervals along the circumferential direction of the coil 30, and between the inductors 31a. Namely, the inductors 31a and the inductors 33a are arranged alternately and separately in the circumferential direction of the coil 30.

The inductors 31a and the inductors 33a are disposed immediately above a portion (the second yoke 33) which is placed so as to surround an outer circumferential face portion of the coil 30. The distances from the center of the coil 30 to the inductors 31a and the inductors 33a are approximately equal to each other.

The inductors 31a, 33a are disposed so as to extend in the axial direction from the outer circumferential face of the coil 30. The inner circumferential faces (the face on the side located in the center direction of the coil 30) of the inductors are opposed to the outer circumferential face (the face in a radial direction) of the magnet M.

The yokes 31b are opposed to one end face portion of the coil 30. The other end face portion of the coil 30 is opposed to the axial direction end face of the magnet M across the yokes 31b and a flange of the cylindrical body 13.

The third yoke 34 has a ring plate shape, and is disposed to be opposed to the other end face portion of the coil 30. A part of the outer circumferential side of the third yoke 34 is cut away so that a coil wiring takeout portion which is not shown is formed.

The third yoke 34 is coupled to end portions of the first and second yokes 32, 33 which are opposite to the end portions where the inductors 31a, 31b, 33a are disposed. The coil 30 is housed in a space surrounded by the first to third yokes 32 to 34. Wirings from the coil 30 are drawn out from the coil wiring takeout portion which is formed in the outer circumferential side of the third yoke 34, and which is not shown, to the outside. In this way, the wirings of the coil 30 are drawn out from the outer circumferential side to the outside through the coil wiring takeout portion which is formed in the outer circumferential side of the third yoke 34, and which is not shown. As compared with the case where the wirings are drawn out from the inner circumferential side, therefore, the wirings to the controller 57 are laid more easily.

For example, convex-like positioning portions are disposed in the third yoke 34. When the positioning portions are engaged with concave-like cutaway portions formed in the first and second yoke 32, 33, the first and second yoke 32, 33 are positioned at predetermined positions in the circumferential direction, respectively. According to the configuration, the pitch accuracy between the inductors 31a, 33a can be improved. Alternatively, concave-like cutaway portions may be disposed in the third yoke 34, and convex-like positioning portions may be disposed in the first and second yoke 32, 33.

The cutaway portions 40 are disposed in the second yoke 33, and the cutaway portions 39 are disposed in the first yoke 32. In this way, in the second and first yokes 33, 32, the cutaway portions 40, 39 which are formed by cutting away portions between adjacent inductors from the one end sides where the inductors 31a, 33a are disposed are intermittently disposed in the portion which is disposed so as to surround the circumferential face portion of the coil 30, whereby the second and first yokes 33, 32 are magnetically insulated in the circumferential direction. In the magnetic path which is formed along the circumferential faces of the second and first yokes 33, 32, portions which are not required for electricity generation are cut away, so that the iron loss can be reduced and the generated electricity amount can be increased.

In this way, in the yokes, the cutaway portions which are formed by cutting away portions between adjacent inductors from the one end sides where the inductors are disposed, in a direction that is substantially perpendicular to a radial direction are intermittently disposed, whereby, in the yokes, portions which are in the one end side where the inductors are disposed are caused to relatively recede from the magnetic inducible area of the magnet.

Next, the generator 1 including the stator and magnet in the further embodiment will be described with reference to FIG. 22.

The cylindrical body 13 has the stepped shape consisting of the small-diameter portion 13a and the large-diameter portion 13b, and is disposed in the water discharger 3b which is shown in FIGS. 2 and 3, in a state where the interior of the cylindrical body communicates with the water supply channel. In this case, the cylindrical body is disposed in such a manner that the center axis direction of the cylindrical body 13 (the rotor vane 15) is substantially parallel to the direction of flowing water, the small-diameter portion 13a is directed toward the downstream side, and the large-diameter portion 13b is directed toward the upstream side.

In the cylindrical body 13, in the sequence starting from the upstream side, a cap 314, the rotor vane 15, and the bearing 17 are disposed. The bearing 17 is disposed inside the small-diameter portion 13a, and the cap 314 and the rotor vane 15 are disposed inside the large-diameter portion 13b.

The opening at the upstream end of the large-diameter portion 13b is liquid-tightly closed by the sealing member 51 through the O-ring 52. A stepped hole is disposed inside the sealing member 51. The step portion 51a of the member is annularly formed, and the cap 314 is supported on the step portion 51a. The cap 314 is fixed to the cylindrical body 13, and set so as not to rotate.

The rotor vane 15 is disposed on the downstream side of the cap 314. The rotor vane 15 has a columnar shape, and the plurality of projective rotor vane blades 19 which are projected in a radially inward direction are disposed. Each space which is between adjacent ones of the rotor vane blades 19 in the circumferential direction functions as the rotor vane channel 72.

A gap which enables the rotor vane 15 to be rotatable is disposed between an end face of a rotor vane integral rotary member 315a (which will be described later) and the magnet M, and the cylindrical body 13 and the sealing member 51.

The center shaft 24 which is integrated with the bearing 17 is disposed so as to be projected toward the upstream side. The center shaft 24 is passed through a boss portion 15b of the rotor vane 15 so that the rotor vane 15 is rotatable about the center shaft 24. Alternatively, the rotor vane 15 and the center shaft 24 may be integrated with each other, and both end portions of the center shaft 24 are supported by the cap 314 and the bearing 17, so that the rotor vane 15 which is integrated with the center shaft 24 is rotated. Namely, the rotor vane 15 having the rotor vane blades may be disposed in the water supply channel so that the axial direction of the rotor vane 15 is substantially parallel to the water supply channel. Here, the axial direction of the rotor vane 15 is identical with the direction of the center shaft 24.

The bearing 17 includes: the ring member 21 which is fixed to the inner circumferential face of the cylindrical body 13; and the shaft supporting portion 22 which is disposed at the center of the ring member 21. The ring member 21 and the shaft supporting portion 22 are coupled to each other by the coupling members 23 which are radially disposed. The gaps between the coupling members 23 are not closed, and are passed through the bearing. Therefore, the water flow inside the cylindrical body 13 is not disturbed.

The rotor vane integral rotary member 315a which is disposed downstream from the rotor vane blades 19, and on the side end face on the radially outer side, and the annular magnet M which is fixed to an outer circumferential portion of the rotor vane integral rotary member 315a are housed in the large-diameter portion 13b of the cylindrical body 13. Outside the small-diameter portion 13a of the cylindrical body 13, the stator 9 is disposed so as to be opposed to an end face which is on the downstream side of the magnet X, and which is substantially perpendicular to a radial direction.

Figure 23:
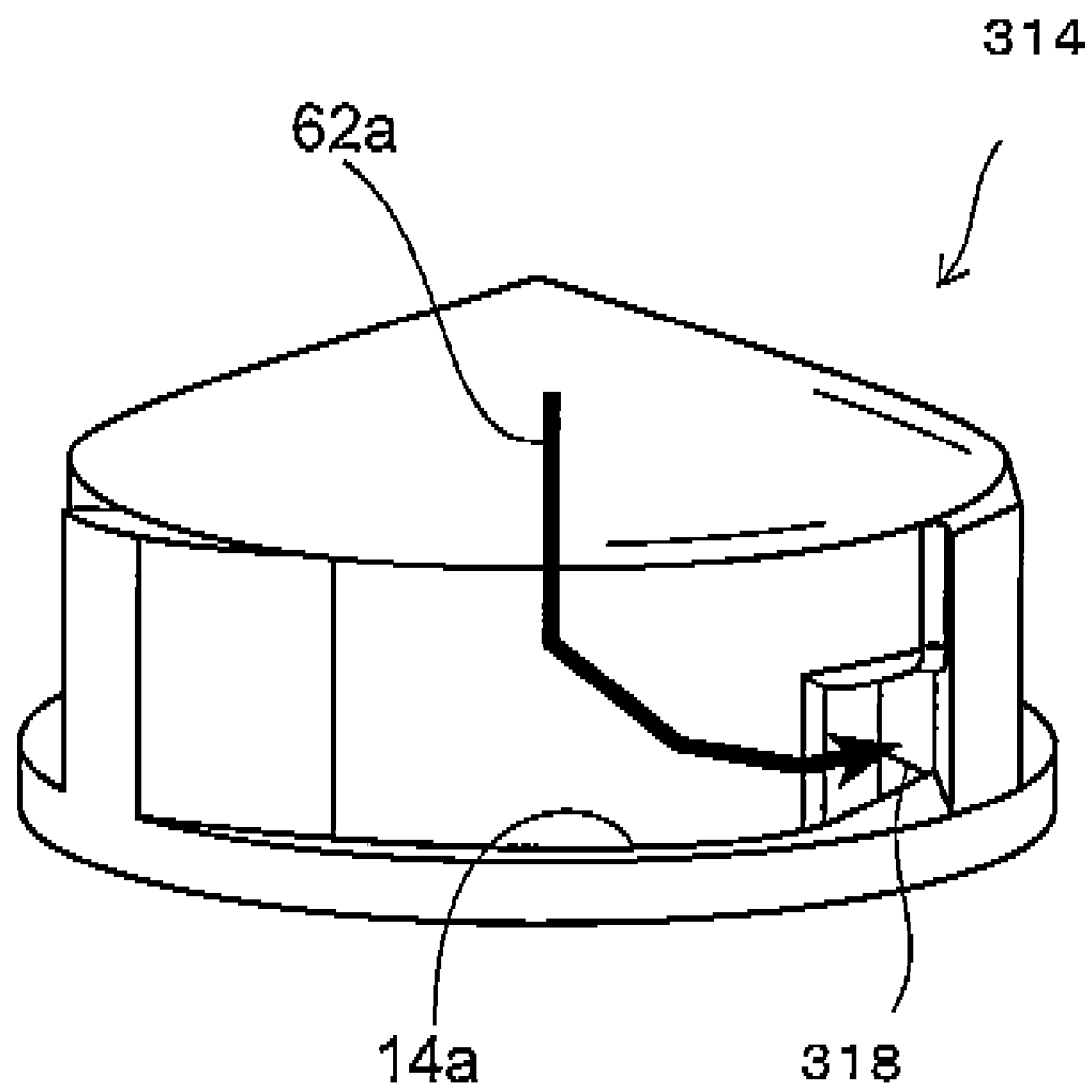
FIG. 23 is a schematic perspective view of a cap of the generator in the further embodiment.

FIG. 23 is a schematic perspective view illustrating the cap 314 of the generator 1 in the further embodiment.

Figure 22:
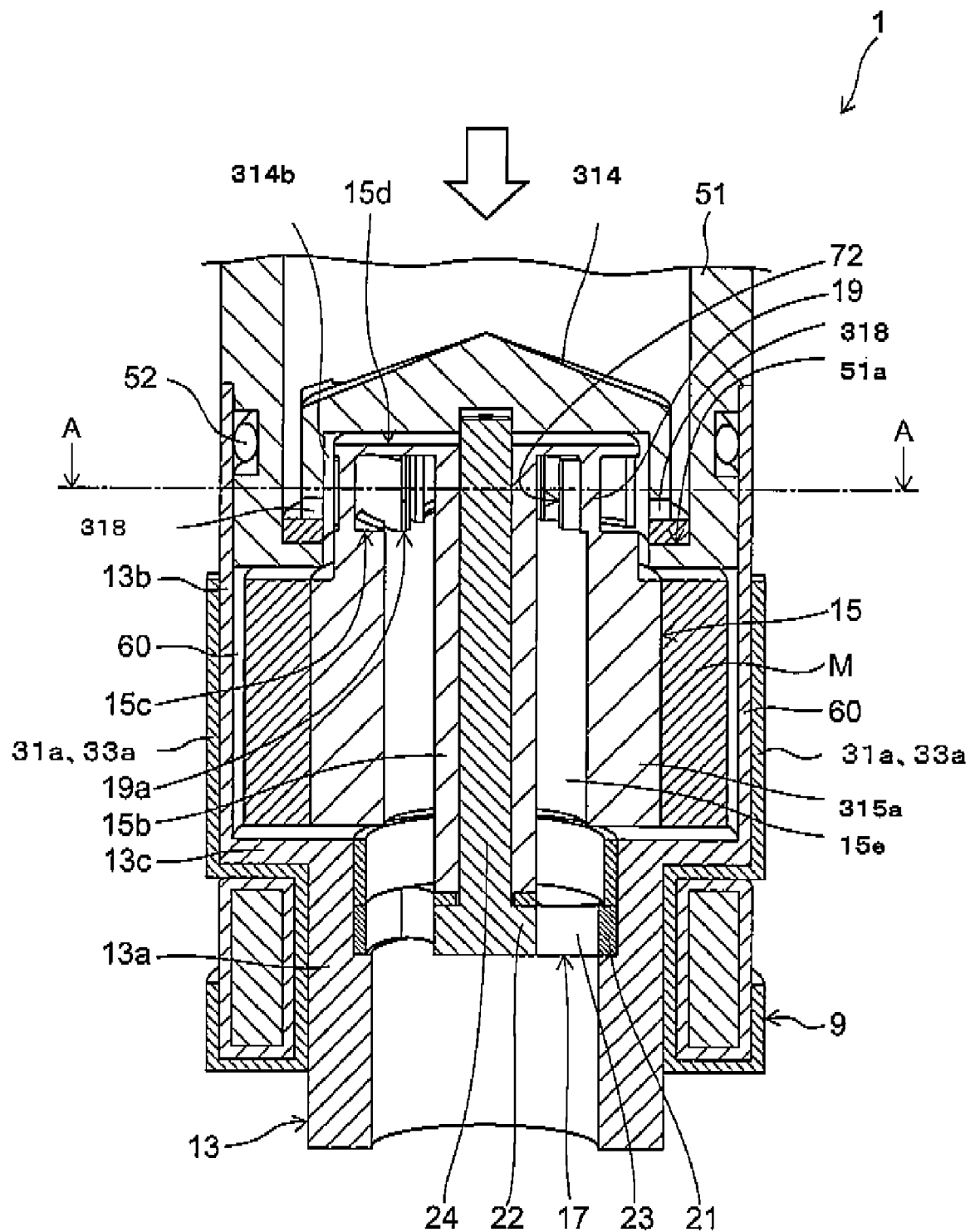
FIG. 22 is a schematic sectional view illustrating a generator having the magnet and the stator in the further embodiment.
Figure 24:
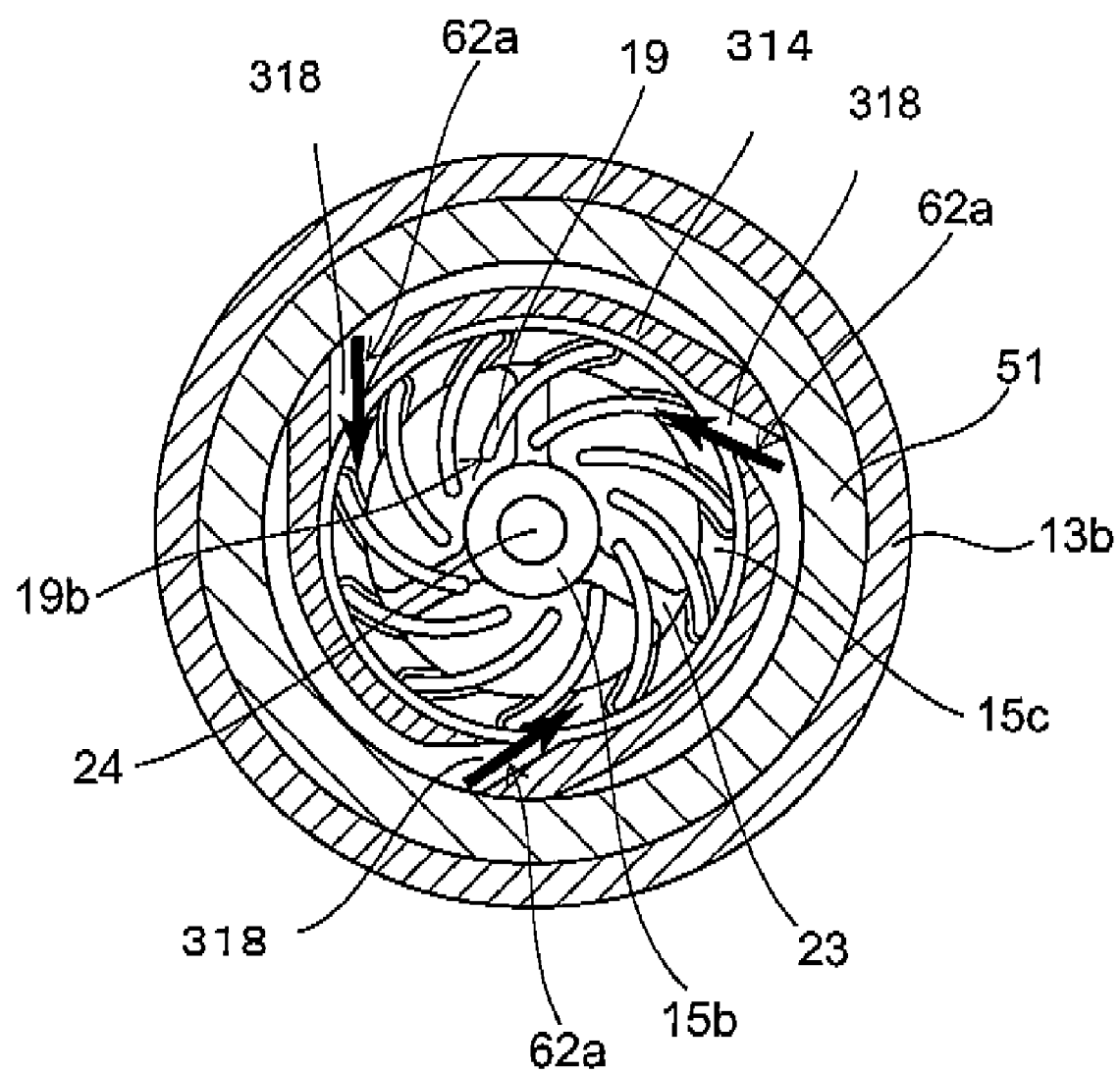
FIG. 24 is a sectional view looking in the direction of the arrow A-A in FIG. 22.

FIG. 24 is a sectional view looking in the direction of the arrow A-A in FIG. 22.

As shown in FIGS. 23 and 24, the cap 314 has a shape in which a conical member is disposed integrally on one end face (the face positioned on the upstream side) of a columnar member. A flange portion 14a is disposed on the other end face (the face positioned on the downstream side) of the columnar member.

A space portion 314b having a columnar shape which is opened in the end face where the flange portion is formed is disposed in the cap 314. The rotor vane blades 19 which are disposed on the side of the upstream end of the rotor vane 15 are housed in the space portion 314b. One end of the center shaft 24 which is passed through the rotor vane 15 is supported on the center axis of the cap 314, and on the face of the cap facing to the space portion 314b.

Three nozzles 318 which communicate with the space portion 314b are disposed in the circumferential face of the cap 314. The nozzles 318 are disposed at regular intervals along the circumferential direction of the circumferential face of the cap so that the lower faces of the nozzles are in contact with the upper face of the flange portion. The nozzles 318 are opened toward the rotor vane blades 19 housed in the space portion 314b, and the directions of the nozzles are oriented toward the inner side with respect to the tangential direction of the circumscribed circle of the rotor vane blades 19.

According to the nozzles 318, water which flows in a direction parallel to the axial direction (the direction of the center shaft 24) of the rotor vane 15 can be ejected from the radially outward direction of the rotor vane blades 19 toward the rotor vane blades 19, in a plane which is substantially perpendicular to the axial direction (the direction of the center shaft 24) of the rotor vane 15.

The direction of the water ejected from the nozzles 318 is oriented toward the inner side with respect to the tangential direction of the circumscribed circle of the rotor vane blades 19.

The upstream end faces of the rotor vane blades 19 are supported by a ceiling portion 15d of the rotor vane 15, and the downstream end faces 19a are supported by a blade supporting face 15c of the rotor vane 15. In the radially outward end face (outer circumferential face) of the rotor vane 15, therefore, the rotor vane blades 19 are not supported, and water can flow from the radially outward end face (outer circumferential face) of the rotor vane 15 toward the inner side.

As shown in FIG. 24, the rotor vane blades 19 are configured by curves, and curved in a direction along which the tip ends approach the center of the rotor vane 15. Outlet ends 19b of the rotor vane blades 19 are separated from the boss portion 15b of the rotor vane 15, and the rotor vane blades are configured so that smooth water flows along the rotor vane blades 19 are formed from the inlet side of the rotor vane blades 19 toward the outlet sides. Therefore, the impeller efficiency can be improved, and hydro energy can be efficiently converted to electric power.

The number of the rotor vane blades 19 is not equal to an integer multiple of the number of the nozzles 318. For example, the number of the rotor vane blades 19 is eleven, and that of the nozzles 318 is three. When the number of the rotor vane blades 19 is different from an integer multiple of the number of the nozzles 318, the timings of ejections to the rotor vane blades 19 can be staggered, and hence it is possible to prevent the rotor vane blades 19 from generating vibrations and noises.

The outlet ends 19b of the rotor vane blades 19 are disposed so as to be projected toward the inside of the rotor vane 15 with respect to the blade supporting face 15c supporting the downstream end faces of the rotor vane blades 19. Therefore, the radial dimension of water channels 15e which are disposed inside the blade supporting face 15c can be increased, and hence the pressure loss can be suppressed. Furthermore, the radial length of the rotor vane blades 19 can be increased, so that the area of the rotor vane blades 19 can be increased. As a result, the impeller efficiency can be improved, and hydro energy can be efficiently converted to electric power.

The downstream end faces 19a of the rotor vane blades 19 are positioned downstream from the nozzles 318. Among the water flows ejected from the nozzles 318, also those which spread toward the downstream side can be caused to impinge on the rotor vane blades 19, with the result that the impeller efficiency can be improved, and hydro energy can be efficiently converted to electric power.

As shown in FIG. 23, according to the nozzles 318, a water flow 62a which flows in a direction parallel to the center shaft 24 can be ejected from the radially outward direction of the rotor vane 15 (rotor vane blades 19) toward the inner side, in a plane which is substantially perpendicular to the center shaft 24.

Although the embodiments of the invention have been described, the invention is not restricted to the description of the embodiments. For example, the generator 1 of the further embodiment shown in FIG. 22 may have a structure which has the magnet and stator shown in FIGS. 5 and 8 and the like, in place of the magnet M and stator 9 of FIGS. 20 and 21. The magnet M and stator 9 of FIGS. 20 and 21 may be used in the generator 1 of FIG. 1.

What is claimed is:

1. A faucet generator comprising:
a rotor vane which is disposed in a water supply channel;
an annular magnet which is rotatable integrally with said rotor vane; and
a stator having a coil which is disposed to be opposed to an end face of said magnet that is substantially perpendicular to a radial direction, a plurality of inductors which are placed separately from one another along a circumferential direction between said end face of said magnet and said coil, and a yoke which is disposed to be continuously contacted with said inductors and surround said coil,
wherein an axial direction of said rotor vane is substantially parallel to said water supply channel,
end faces of said annular magnet which are substantially perpendicular to a radial direction are alternately magnetized with N and S poles along a circumferential direction of said magnet, and,
in one end of said yoke that is on a side where said inductors are disposed, portions which are in a vicinity of tip ends of said inductors are formed to relatively recede from a magnetic inducible area of said magnet.

2. A faucet generator according to claim 1, wherein said yoke has cutaway portions which are formed by cutting away portions that are in the vicinity of the tip ends of said inductors, in one end that is opposed to a circumferential face portion of said coil, and that is on the side where said inductors are disposed, and
portions of said yoke which are in the vicinity of the tip ends of said inductors are formed to relatively recede from the magnetic inducible area of said magnet.

3. A faucet generator according to claim 2, wherein said cutaway portions are formed by cutting away portions that are in the vicinity of the tip ends of said inductors, in a direction which is substantially perpendicular to a radial direction.

4. A faucet generator according to claim 1, wherein an inner diameter of said magnet is formed to be larger than an inner diameter of said stator, an outer diameter of said magnet is formed to be smaller than an outer diameter of said stator, and
portions of said yoke which are in the vicinity of the tip ends of said inductors are formed to relatively recede from the magnetic inducible area of said magnet.

5. A faucet generator according to claim 1, wherein an outer diameter of said magnet is formed to be smaller than an outer diameter of said stator, said yoke has cutaway portions which are formed by cutting away portions that are in the vicinity of the tip ends of said inductors, in one end that is on the side where said inductors are disposed, in portions that are on a side of an inner circumferential face of said magnet, and
portions of said yoke which are in the vicinity of the tip ends of said inductors are formed to relatively recede from the magnetic inducible area of said magnet.

6. A faucet generator according to claim 1, wherein an inner diameter of said magnet is formed to be larger than an inner diameter of said stator, said yoke has cutaway portions which are formed by cutting away portions that are in the vicinity of the tip ends of said inductors, in one end that is on the side where said inductors are disposed, in portions that are on a side of an outer circumferential face of said magnet, and
portions of said yoke which are in the vicinity of the tip ends of said inductors are formed to relatively recede from the magnetic inducible area of said magnet.

7. A faucet generator comprising:
a rotor vane which is disposed in a water supply channel;
an annular magnet which is rotatable integrally with said rotor vane; and
a stator having a coil which is disposed to be opposed to an end face of said magnet that is substantially perpendicular to a radial direction, a plurality of inductors which are opposed to a side face of said magnet, and which are placed separately from one another along a circumferential direction, and a yoke which is disposed to be continuously contacted with said inductors and surround said coil,
wherein an axial direction of said rotor vane is substantially parallel to said water supply channel,
in said annular magnet, said side face is alternately magnetized with N and S poles along a circumferential direction of said magnet, and
said yoke has cutaway portions which are formed by partially cutting away an end portion that is opposed to a circumferential face portion of said coil, that is on a side where said inductors are disposed, and that is substantially perpendicular to a radial direction.

8. A faucet generator according to claim 1, wherein said rotor vane is rotated by a force of a water flow, the water flow flowing inside with respect to an inner circumferential face of said magnet which is disposed to surround at least a rotor vane upstream portion that is a part of said rotor vane, or with respect to an inner circumferential face of a rotor vane ring that integrates said rotor vane with said magnet.

9. A faucet generator according to claim 7, wherein said rotor vane is rotated by a force of a water flow, the water flow flowing inside with respect to an inner circumferential face of said magnet which is disposed to surround at least a rotor vane upstream portion that is a part of said rotor vane, or with respect to an inner circumferential face of a rotor vane ring that integrates said rotor vane with said magnet.

* * * * *